(12) United States Patent
Matsui et al.

(10) Patent No.: US 11,086,321 B2
(45) Date of Patent: Aug. 10, 2021

(54) VEHICLE CONTROL APPARATUS, VEHICLE CONTROL METHOD, AND RECORDING MEDIUM

(71) Applicant: Panasonic Intellectual Property Corporation of America, Torrance, CA (US)

(72) Inventors: Shuhei Matsui, Osaka (JP); Naoyuki Harada, Osaka (JP); Hideo Umetani, Kanagawa (JP); Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 236 days.

(21) Appl. No.: 16/352,394

(22) Filed: Mar. 13, 2019

(65) Prior Publication Data

US 2019/0212740 A1 Jul. 11, 2019

Related U.S. Application Data

(63) Continuation of application No. PCT/JP2018/004779, filed on Feb. 13, 2018.

(30) Foreign Application Priority Data

Mar. 29, 2017 (JP) .............................. JP2017-066358

(51) Int. Cl.
*G05D 1/00* (2006.01)
*G05D 1/02* (2020.01)
*G08G 1/123* (2006.01)

(52) U.S. Cl.
CPC ......... *G05D 1/0088* (2013.01); *G05D 1/0223* (2013.01); *G08G 1/123* (2013.01);
(Continued)

(58) Field of Classification Search
CPC .. G05D 1/0088; G05D 1/0223; G05D 1/0246; G05D 2201/0212;
(Continued)

(56) References Cited

U.S. PATENT DOCUMENTS 9,494,938 B1 11/2016 Kemler et al.
2012/0142354 A1 6/2012 Ahluwalia
(Continued)

FOREIGN PATENT DOCUMENTS

JP 2006-110207 A 4/2006
JP 2015-191264 11/2015
(Continued)

OTHER PUBLICATIONS

The Extended European Search Report dated Mar. 13, 2020 for the related European Patent Application No. 18777912.9.
(Continued)

*Primary Examiner* — James J Lee
*Assistant Examiner* — Shon G Foley
(74) *Attorney, Agent, or Firm* — Greenblum & Bernstein, P.L.C.

(57) ABSTRACT

An apparatus is mounted on a vehicle that is autonomously driven and that is used for passenger transportation. The apparatus includes: a processor; and a memory storing thereon a computer program. When executed by the processor, the program causes the processor to perform operations including: selecting a target person who is at least one of humans who are present around the vehicle and are detected using sensing information about surroundings of the vehicle; acquiring a first state indicating a state of the selected target person; acquiring a second state indicating a state of the vehicle changing a speed setting of the vehicle in accordance
(Continued)

with the first state and the second state; and controlling traveling of the vehicle at a speed indicated by the speed setting.

10 Claims, 15 Drawing Sheets

(52) U.S. Cl.
CPC ... *G05D 1/0246* (2013.01); *G05D 2201/0212* (2013.01); *G05D 2201/0213* (2013.01)

(58) Field of Classification Search
CPC ...... G05D 2201/0213; B60W 2720/10; B60W 2554/806; B60W 2554/4044; B60W 2554/4045; B60W 2554/4029; B60W 60/00253; G06K 9/00791; G06K 9/00362; G08G 1/005; G08G 1/04; G08G 1/202; G08G 1/123; G06Q 50/30
See application file for complete search history.

(56) References Cited

U.S. PATENT DOCUMENTS

| | | | |
|---|---|---|---|
| 2016/0272172 A1* | 9/2016 | Lee | B60T 8/171 |
| 2018/0129981 A1 | 5/2018 | Fujimoto | |
| 2020/0086764 A1* | 3/2020 | Mimura | B60N 2/01 |

FOREIGN PATENT DOCUMENTS

| | | |
|---|---|---|
| JP | 2015-191641 A | 11/2015 |
| JP | 2016-110641 | 6/2016 |
| JP | 2016-130935 | 7/2016 |
| JP | 2016-523751 | 8/2016 |
| JP | 2016-171597 A | 9/2016 |
| JP | 2018-073351 A | 5/2018 |
| WO | 2014/179109 | 11/2014 |

OTHER PUBLICATIONS

International Search Report of PCT application No. PCT/JP2018/004779 dated Mar. 13, 2018.

* cited by examiner

FIG. 9A

|  | GENDER (0: MALE, 1: FEMALE) | AGE (YEARS OLD) | ACTION (1: WALKING, 2: BEING STILL, 3: JOGGING) | ... | PRECIPITATION PROBABILITY (%) | PRESENCE/ ABSENCE OF RAIN (0: ABSENT, 1: PRESENT) | PRIORITY (0 TO 100) |
|---|---|---|---|---|---|---|---|
| P1 | 0 | >10 | 1 |  | >50 | 1 | 20 |
| P2 | 0 | >10 | 1 |  | >50 | 0 | 10 |
| P3 | 1 | >10 | 1 |  | >50 | 1 | 20 |
| P4 | 1 | >10 | 1 |  | >50 | 0 | 10 |
| ... |  |  |  |  |  |  |  |

FIG. 9B

| | GENDER (0: MALE, 1: FEMALE) | AGE (YEARS OLD) | ACTION (1: WALKING, 2: BEING STILL, 3: JOGGING) | ... | PRECIPITATION PROBABILITY (%) | PRESENCE/ ABSENCE OF RAIN (0: ABSENT, 1: PRESENT) | PRIORITY (0 TO 100) | CONTENT OF RIDE RECOMMENDATION |
|---|---|---|---|---|---|---|---|---|
| P1 | 0 | >10 | 1 | | >50 | 1 | 20 | SINCE IT IS RAINING, WOULD LIKE A RIDE? |
| P2 | 0 | >10 | 1 | | >50 | 0 | 10 | SINCE IT MAY RAIN FROM NOW, WOULD LIKE A RIDE? |
| P3 | 1 | >10 | 1 | | >50 | 1 | 20 | SINCE IT IS RAINING, WOULD LIKE A RIDE? |
| P4 | 1 | >10 | 1 | | >50 | 0 | 10 | SINCE IT MAY RAIN FROM NOW, WOULD LIKE A RIDE? |
| ... | | | | | | | | |

VEHICLE CONTROL APPARATUS, VEHICLE CONTROL METHOD, AND RECORDING MEDIUM

BACKGROUND

1. Technical Field

The present disclosure relates to a vehicle control apparatus, a vehicle control method, and a recording medium.

2. Description of the Related Art

Widespread use of autonomous driving vehicles in the future is predicted, and various technologies for autonomously controlling traveling of vehicles have been proposed (for example, see Japanese Unexamined Patent Application Publication No. 2016-130935 (hereinafter referred to as "Patent Document 1"). Patent Document 1 proposes a method in which a vehicle that is traveling by autonomous driving performs speed adjustment based on a distance to another vehicle and so on.

SUMMARY

Meanwhile, with widespread use of autonomous driving vehicles, unmanned autonomous driving vehicles, such as autonomously driven unmanned taxies, used for transportation are thought to become popular.

However, Patent Document 1 described above does not disclose any technology for an unmanned taxy traveling with no passenger on board to access a passenger candidate. Thus, the unmanned taxy with no passenger on board has to travel to a predetermined place, such as a taxi stand, and there is a problem in that the efficiency of energy consumed to move the unmanned taxy is low.

One non-limiting and exemplary embodiment provides a vehicle control apparatus, a vehicle control method, and a program that can improve the efficiency of energy consumed by vehicles used for passenger transportation.

In one general aspect, the techniques disclosed here feature an apparatus mounted on a vehicle that is autonomously driven and that is used for passenger transportation. The apparatus includes: a processor; and a memory storing thereon a computer program, which when executed by the processor, causes the processor to perform operations including: selecting a target person who is at least one of humans who are present around the vehicle and are detected using sensing information about surroundings of the vehicle; acquiring a first state indicating a state of the selected target person; acquiring a second state indicating a state of the vehicle; changing a speed setting of the vehicle in accordance with the first state and the second state; and controlling traveling of the vehicle at a speed indicated by the speed setting.

According to a vehicle control apparatus and so on in the present disclosure, it is possible to improve the efficiency of energy consumed by vehicles used for passenger transportation.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9A is a table illustrating one example of a selection rule according to the second embodiment;

FIG. 9B is a table illustrating another example of the selection rule according to the second embodiment;

DETAILED DESCRIPTION

Figure 1:
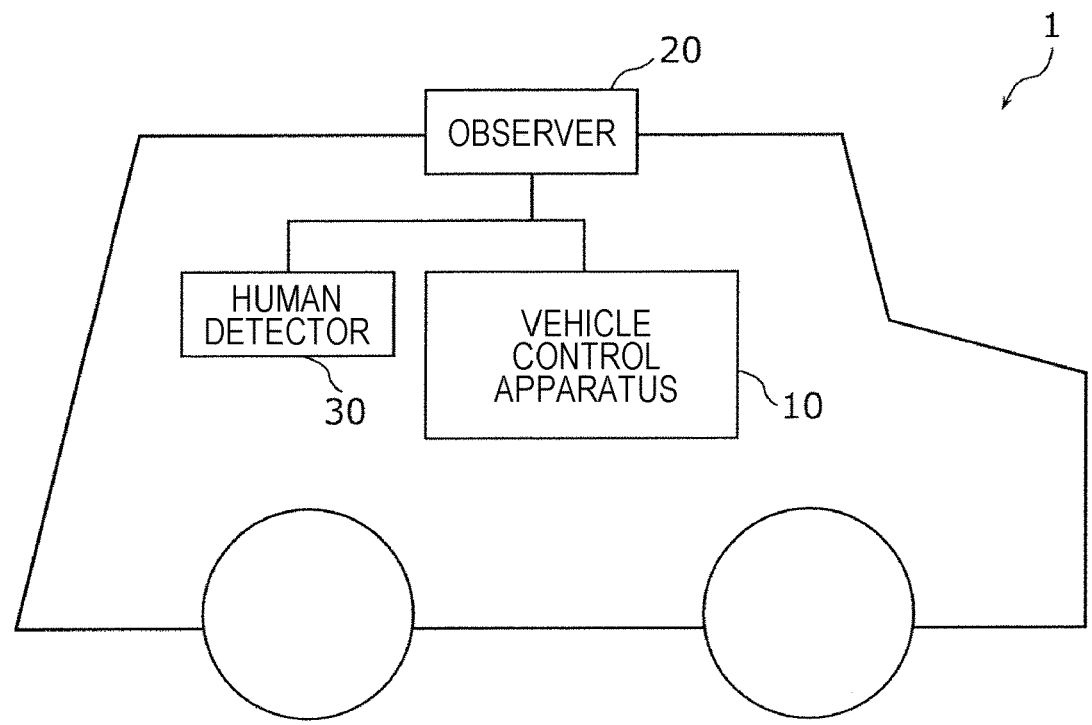
FIG. 1 is a diagram illustrating one example of the configuration of a vehicle according to a first embodiment.

A vehicle control apparatus according to one aspect of the present disclosure is directed to an apparatus mounted on a vehicle that is autonomously driven and that is used for passenger transportation. The apparatus includes: a processor; and a memory storing thereon a computer program, which when executed by the processor, causes the processor to perform operations including: selecting a target person who is at least one of humans who are present around the vehicle and are detected using sensing information about surroundings of the vehicle; acquiring a first state indicating a state of the selected target person; acquiring a second state indicating a state of the vehicle; changing a speed setting of the vehicle in accordance with the first state and the second state; and controlling traveling of the vehicle at a speed indicated by the speed setting.

This makes it possible to improve the efficiency of energy consumed by vehicles used for passenger transportation.

Of a position, a movement direction, and a movement speed of the target person, at least the position and the movement direction may be included in the first state.

In the changing, when a movement direction of the target person which is indicated by the first state and a movement direction of the vehicle which is indicated by the second state differ from each other, the speed setting may be changed so as to reach a speed for causing the vehicle to stop temporarily or slow down, and when the movement direction of the target person which is indicated by the first state and the movement direction of the vehicle which is indicated by the second state are the same, the speed setting may be changed so as to adjust a speed of the vehicle to the speed of the target person which is indicated by the first state.

The apparatus may further output, to the target person, recommendation information indicating a recommendation for riding in the vehicle for performing the passenger transportation, when the traveling is controlled in the controlling, and a distance between the target person and the vehicle becomes smaller than or equal to a threshold.

The apparatus may further determine whether or not the target person has an intension of riding in the vehicle, based on motion or an action of the target person after the recommendation information is output in the outputting.

The motion or the action may include at least one of a change in a direction of the target person relative to the vehicle, a change in a speed of the target person, motion of a hand of the target person, motion of the head of the target person, and content indicated by voice information of the target person.

The apparatus may further obtain the sensing information by sensing the surroundings of the vehicle and may detect humans who are present around the vehicle from the sensing information.

The apparatus may further store a selection rule used for selecting the target person, and may select the target person by using the selection rule and verification data indicating attributes and actions of the humans who are present around the vehicle, the verification data being created from the sensing information.

The apparatus may further obtain environment information about the surroundings of the vehicle, based on the sensing information, and may create the verification data, based on human information indicating the attributes and the actions of the humans who are present around the vehicle and the environment information.

The apparatus may further update the selection rule, based on the verification data indicating an attribute and an action of at least one human who has been selected as the target person and who has ever ridden in the vehicle.

Not only is the present disclosure implemented as an apparatus, but also the present disclosure can be implemented as an integrated circuit that includes processing means included in such an apparatus, can be implemented as a method in which the processing means constituting the apparatus are steps, can be implemented as a program that causes a computer to execute the steps, and can be implemented as information, data, or signals indicating the program. These program, information, data and signals may be distributed via recording media, such as compact disc read-only memories (CD-ROMs), and communication media, such as the Internet.

Embodiments of the present disclosure will be described below with reference to the accompanying drawings. The embodiments described below each represent a preferred specific example in the present disclosure. Numerical values, shapes, materials, constituent elements, the arrangement positions and connection forms of constituent elements, steps, the order of steps, and so on described in the embodiments below are examples and are not intended to limit the present disclosure. Also, of the constituent elements in the embodiments below, constituent elements not set forth in the independent claims that represent the broadest concept of the present disclosure will be described as optional constituent elements that constitute a more preferred mode.

First Embodiment

[Vehicle 1]

First, a description will be given of a vehicle 1 on which a vehicle control apparatus 10 in a first embodiment is mounted.

The vehicle 1 is used for passenger transportation and is autonomously driven. The vehicle 1 is, for example, an autonomously driven unmanned taxy.

FIG. 1 is a diagram illustrating one example of the configuration of the vehicle 1 according to the first embodiment.

The vehicle 1 illustrated in FIG. 1 includes the vehicle control apparatus 10, an observer 20, and a human detector 30. The vehicle control apparatus 10, the observer 20, and the human detector 30 may directly perform communication, for example, through a wireless local area network (LAN) or a wired LAN.

[Observer 20]

The observer 20 obtains sensing information about surroundings of the vehicle 1 by sensing the surroundings of the vehicle 1. In the present embodiment, the observer 20 measures the surroundings of the vehicle 1, for example, by using a sensor constituted by at least one of a camera for acquiring two-dimensional (2D) images, a stereo camera, a time-of-flight (ToF) camera, and a light detection and ranging (LiDAR) sensor for obtaining information on a three-dimensional (3D) point group. The observer 20 obtains sensing information, which is a measurement result of the sensor. The sensor may be mounted on the vehicle 1. The sensor may also include a microphone for obtaining sound.

[Human Detector 30]

The human detector 30 detects humans who are around the vehicle 1 from the sensing information obtained by the observer 20. In the present embodiment, the human detector 30 obtains, for example, an image resulting from photography around the vehicle 1 from the sensing information obtained by the observer 20. The human detector 30 causes a detection-target region in the obtained image to move and detects humans shown in the image, based on features, such as the histograms of oriented gradients (HOG), extracted from the detection-target region, to thereby detect humans who are present around the vehicle 1.

[Vehicle Control Apparatus 10]

Figure 2:
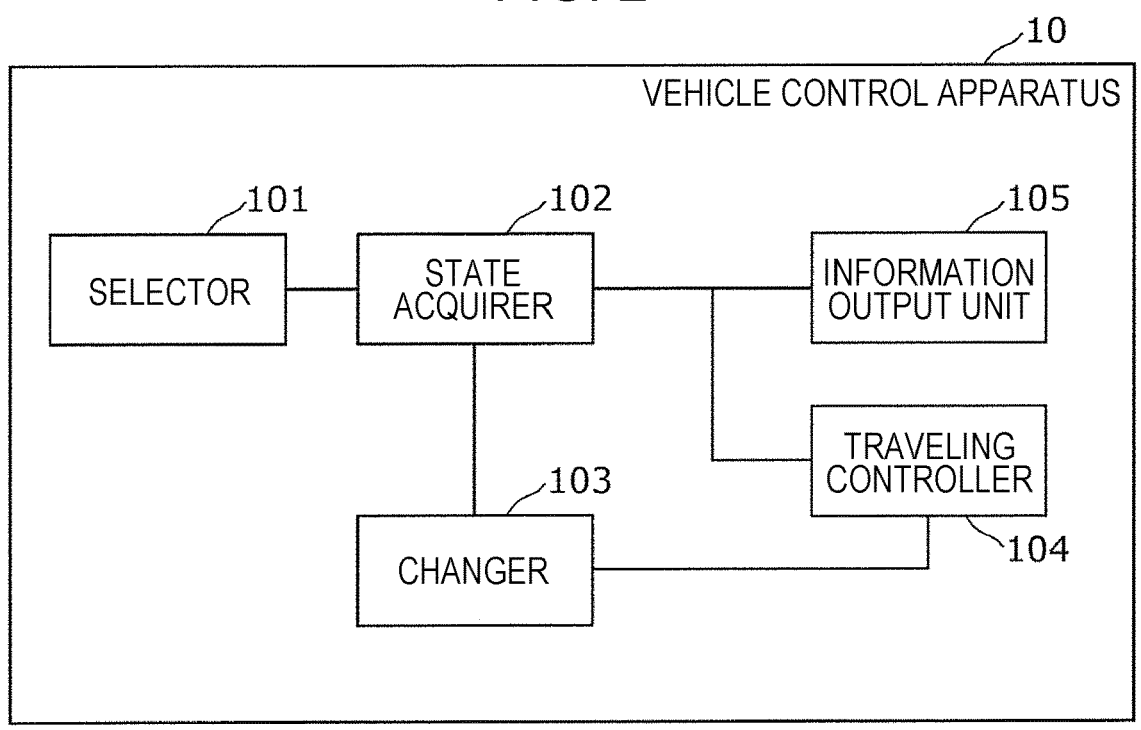
FIG. 2 is a diagram illustrating one example of the configuration of a vehicle control apparatus according to the first embodiment.

FIG. 2 is a diagram illustrating one example of the configuration of the vehicle control apparatus 10 according to the first embodiment. The vehicle control apparatus 10 illustrated in FIG. 2 includes a selector 101, a state acquirer 102, a changer 103, a traveling controller 104, and an information output unit 105 and is mounted on the vehicle 1. It is not essential for the vehicle control apparatus 10 to include the information output unit 105, and the vehicle control apparatus 10 may or may not include the information output unit 105.

<Selector 101>

The selector 101 selects a target person who is at least one of humans who are present around the vehicle 1 and are detected using the sensing information about the surroundings of the vehicle 1. In the present embodiment, the selector 101 selects, as a target person, at least one of humans, such as pedestrians, who are present around the vehicle 1 and are detected by the human detector 30. This target person is a human to whom the vehicle control apparatus 10 mounted in the vehicle 1 makes access for checking an intension of riding in the vehicle 1 as a passenger candidate thereof. The target person is, for example, a pedestrian. The selector 101 may randomly select one of the humans who are present around the vehicle 1 and are detected by the human detector 30 or may select one of the humans based on a predetermined selection rule. A conceivable example of the predetermined selection rule is a rule that specifies priorities based on positional relationships between the vehicle 1 and target people, such as a rule that gives high priority to a human who can see the vehicle 1 and who is relatively close in distance.

<State Acquirer 102>

The state acquirer 102 acquires a first state indicating the state of a target person selected by the selector 101. In this case, of the position, the movement direction, and the movement speed of the target person, at least the position and the movement direction are included in the first state.

In the present embodiment, based on the sensing information obtained by the observer 20, the state acquirer 102 acquires the state of the target person selected by the selector 101. The state of the target person refers to, for example, the position where the target person is present and the movement direction of the target person. When the target person is standing still, the movement direction may be regarded as being 0. The state of the target person may further include a movement speed.

Also, based on the sensing information obtained by the observer 20, the state acquirer 102 acquires the state of the vehicle 1. The state of the vehicle 1 refers to, for example, a position on a road where the vehicle 1 is traveling or the position of a driving lane, the movement speed of the vehicle 1, the movement direction of the vehicle 1.

<Changer 103>

The changer 103 changes a speed setting of the vehicle 1 in accordance with a second state indicating the state of the vehicle 1 and the above-described first state. For example, when the movement direction of the target person which is indicated by the first state and the movement direction of the vehicle 1 which is indicated by the second state differ from each other, the changer 103 may change the speed setting to a speed so as to cause the vehicle 1 to stop temporarily or slow down. Also, when the movement direction of the target person which is indicated by the first state and the movement direction of the vehicle 1 which is indicated by the second state are the same, the changer 103 may change the speed setting to adjust the vehicle 1 to the speed of the target person which is indicated by the first state.

In the present embodiment, the changer 103 changes the speed setting so as to reach a speed that corresponds to the state of the target person selected by the selector 101. For example, when the movement direction of the vehicle 1 and the movement direction of the target person differ from each other, the changer 103 may set the speed to cause the vehicle 1 to slow down or stop temporarily. Also, when the movement direction of the vehicle 1 and the movement direction of the target person are the same, the changer 103 sets the speed of the vehicle 1 so as to reach a speed that is higher than or equal to the moving speed of the target person in order to cause the vehicle 1 to travel side-by-side with the target person.

<Traveling Controller 104>

The traveling controller 104 controls traveling of the vehicle 1 at the speed indicated by the speed setting changed by the changer 103. In the present embodiment, the traveling controller 104 controls traveling of the vehicle 1 in accordance with the target person. Specifically, when the speed of the vehicle 1 may be changed according to the situation of another vehicle different from the vehicle 1, the traveling controller 104 controls the traveling of the vehicle 1 so as to reach the speed changed by the changer 103. For example, when the movement direction of the vehicle 1 and the movement direction of the target person are the same, the traveling controller 104 controls the traveling with a speed for adjusting the vehicle 1 to the moving speed of the target person to thereby cause the vehicle 1 to move close to the target person and to travel side-by-side with the target person. When the movement direction of the vehicle 1 and the movement direction of the target person differ from each other, the traveling controller 104 causes the vehicle 1 to slow down or stop temporarily. Also, for example, when the target person shows an intension of riding in the vehicle 1, the traveling controller 104 may perform control for causing the vehicle 1 to move close to the target person and then to stop.

<Information Output Unit 105>

When the traveling controller 104 controls the traveling of the vehicle 1, as described above, and the distance between the target person and the vehicle 1 becomes smaller than or equal to a threshold, the information output unit 105 outputs, to the target person, recommendation information indicating a recommendation for riding in the vehicle 1 for performing passenger transportation.

In the present embodiment, the information output unit 105 outputs information for urging the target person to ride in. Specifically, the information output unit 105 outputs, to the target person, for example, recommendation information indicating a ride recommendation, such as content or a message for urging the target person to ride in. The ride recommendation information is, for example, "Would you like a ride?". The information output unit 105 may output such recommendation information via sound by using a speaker or may output such recommendation information via video of characters or the like by using a display. When the information output unit 105 outputs the recommendation information or the like via sound, a human who is not looking at the vehicle 1 can be approached through interaction-based exchange.

[Operation of Vehicle Control Apparatus 10]

Next, an overview of the operation of the vehicle control apparatus 10 configured as described above will be described with reference to FIG. 3.

Figure 3:
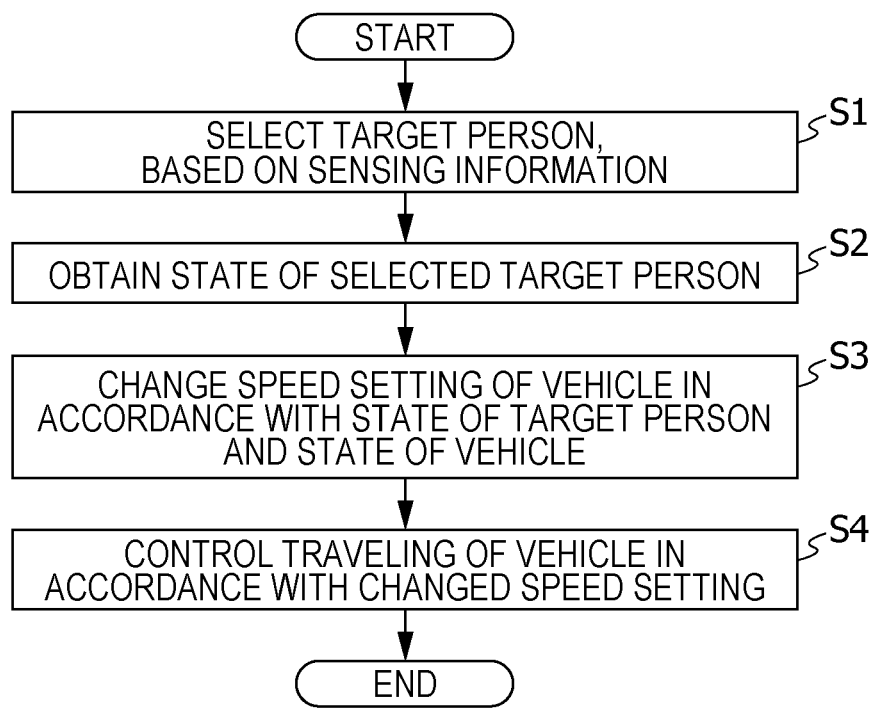
FIG. 3 is a flowchart illustrating the operation of the vehicle control apparatus according to the first embodiment.
Figure 4:
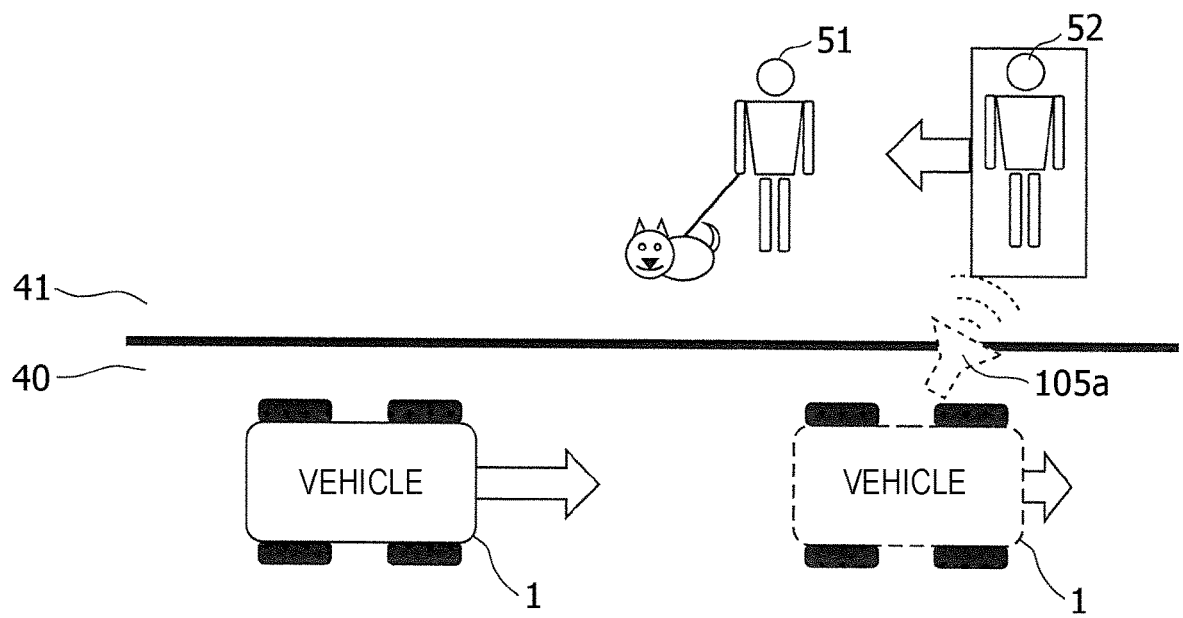
FIG. 4 is an explanatory diagram of one example of the operation of the vehicle control apparatus according to the first embodiment.
Figure 5:
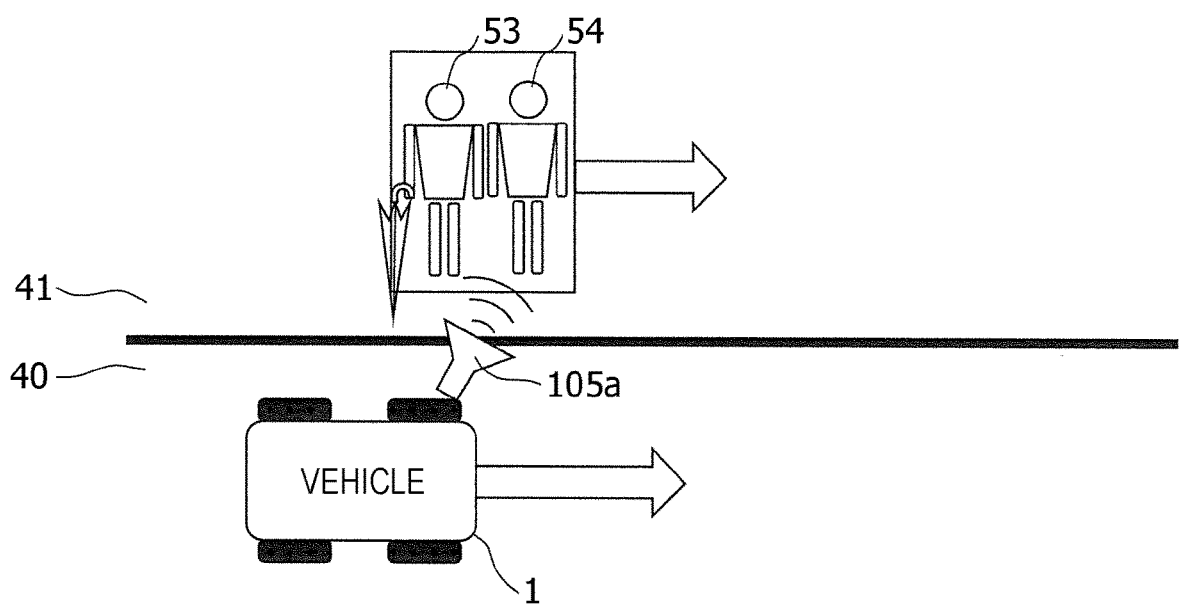
FIG. 5 is an explanatory diagram of one example of the operation of the vehicle control apparatus according to the first embodiment.

FIG. 3 is a flowchart illustrating the operation of the vehicle control apparatus 10 according to the first embodiment. FIGS. 4 and 5 are explanatory diagrams of one example of the operation of the vehicle control apparatus 10 according to the first embodiment. FIG. 4 illustrates, as an example, a pedestrian 51 who is walking a pet on a sidewalk 41 and a pedestrian 52 who is moving in a direction opposite to the movement direction of the vehicle 1 on a road 40. FIG. 5 illustrates, as an example, pedestrians 53 and 54 who are moving on the sidewalk 41 in the same direction as the movement direction of the vehicle 1 on the road 40.

First, the vehicle control apparatus 10 selects a target person, based on sensing information (S1). Specifically, the vehicle control apparatus 10 selects a target person who is at least one of humans who are present around the vehicle 1 and are detected using sensing information about the surroundings of the vehicle 1. The vehicle control apparatus 10 selects the pedestrian 52 as a target person in the example illustrated in FIG. 4 and selects the pedestrians 53 and 54 as target people in the example illustrated in FIG. 5.

Next, the vehicle control apparatus 10 obtains the state of the target person selected in S1 (S2). Specifically, the vehicle control apparatus 10 obtains the first state indicating the position, the movement direction, and the movement speed of the target person selected in S1. Also, the vehicle control apparatus 10 obtains the movement speed and the movement direction of the vehicle 1 as the second state. The vehicle control apparatus 10 obtains the first state indicating the position, the movement direction, and the movement speed of the pedestrian 52 in the example illustrated in FIG. 4 and the movement speed and the movement direction of the vehicle 1 as the second state. Also, the vehicle control apparatus 10 obtains the first state indicating the positions, the movement direction, and the movement speed of the pedestrians 53 and 54 in the example illustrated in FIG. 5 and obtains the movement speed and the movement direction of the vehicle 1 as the second state.

Next, the vehicle control apparatus 10 changes a speed setting of the vehicle 1 in accordance with the state of the target person and the state of the vehicle 1 (S3). Specifically, the vehicle control apparatus 10 changes the speed setting of the vehicle 1 in accordance with the second state indicating the state of the vehicle 1 and the above-described first state. Since the movement direction of the pedestrian 52 and the movement direction of the vehicle 1 differ from each other in the example illustrated in FIG. 4, the vehicle control apparatus 10 may set a speed for causing the vehicle 1 to slow down until it moves close to the pedestrian 52 or for causing the vehicle 1 to move close to the pedestrian 52 and stop temporarily. Also, since the movement direction of the pedestrians 53 and 52 and the movement direction of the vehicle 1 are the same in the example illustrated in FIG. 5, the vehicle control apparatus 10 may set the speed of the vehicle 1 so as to reach a speed that is higher than or equal to the moving speed of the pedestrians 53 and 54.

Next, the vehicle control apparatus 10 controls the traveling of the vehicle 1 in accordance with the speed setting changed in S3 (S4). Specifically, when the movement direction of the vehicle 1 and the movement direction of the target person are the same, the vehicle control apparatus 10 controls the traveling of the vehicle 1 with a speed being adjusted to the moving speed of the target person to cause the vehicle 1 to move close to the target person and to travel side-by-side with the target person. Also, when the movement direction of the vehicle 1 and the movement direction of the target person differ from each other, the vehicle control apparatus 10 causes the vehicle 1 to slow down or stop temporarily. In the example illustrated in FIG. 4, the vehicle control apparatus 10 controls the traveling of the vehicle 1 so as to cause the vehicle 1 to slow down until it moves close to the pedestrian 52 or to move close to the pedestrian 52 and stop temporarily. Also, in the example illustrated in FIG. 5, the vehicle control apparatus 10 may control the traveling of the vehicle 1 at a speed that is higher than or equal to the moving speed of the pedestrians 53 and 54 and may cause the vehicle 1 to travel side-by-side with the pedestrians 53 and 54. The vehicle control apparatus 10 may further make, for example, proactive access for urging the pedestrian 52 in FIG. 4 to ride in or the pedestrians 53 and 54 in FIG. 5 who come close owing to sound output by a speaker 105a or the like.

Then, when the target person shows an intension of riding in the vehicle 1, the vehicle control apparatus 10 performs control for stopping the vehicle 1 after the target person comes close thereto, and can have the target person to ride in as a passenger.

[Advantages, Etc.]

According to the present embodiment, as described above, it is possible to realize a vehicle control apparatus and a vehicle control method that can improve the efficiency of energy consumed by vehicles used for passenger transportation.

Vehicles, such as manned taxis, that are used for passenger transportation and are driven by humans have a possibility of giving a sense of dislike when they make proactive access to passenger candidates, and thus all they could do was to carry out a passive operation method of waiting for access from the customer side. However, since vehicles, such as unmanned taxis, that are used for passenger transportation and are autonomously driven in an unmanned manner can urge the passenger candidate to ride therein, that is, can make proactive access, without giving a sense of dislike, it is possible to realize a proactive-operation method.

Further, according to the present embodiment, the speed of the vehicle 1 can be controlled in accordance with the state of a target person who is a passenger candidate, thus making it possible to make the passenger candidate to notice the proactive access and making it possible to urge the passenger candidate to ride in. That is, the vehicle 1 having the vehicle control apparatus and so on in the present embodiment can improve the occupancy rate by getting passengers therein even at places other than predetermined places, such as taxi stands, thus making it possible to improve the efficiency of energy consumed for moving the vehicle 1.

Although the vehicle control apparatus 10, the observer 20, and the human detector 30 have different configurations in the first embodiment, the present disclosure is not limited thereto. The vehicle control apparatus 10 may also include functions of the observer 20 and functions of the human detector 30. That is, the vehicle control apparatus 10 may include the observer 20 and the human detector 30.

Second Embodiment

Next, a description will be given of a vehicle control apparatus 10A in a second embodiment. Differences from the first embodiment will be mainly described below.

[Configuration of Vehicle Control Apparatus 10A]

Figure 6:
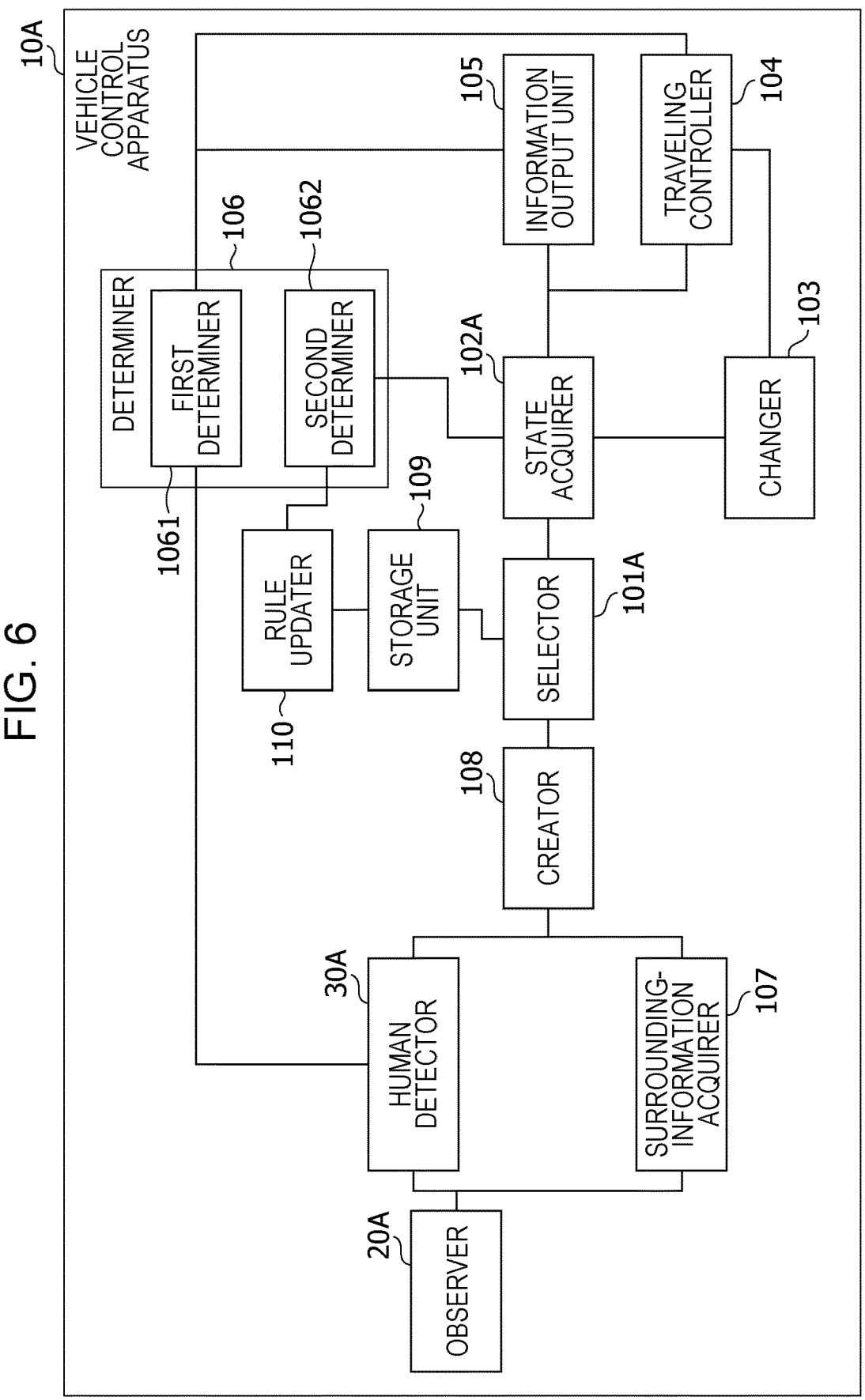
FIG. 6 is a diagram illustrating one example of the configuration of a vehicle control apparatus according to a second embodiment.

FIG. 6 is a diagram illustrating one example of the configuration of the vehicle control apparatus 10A according to the second embodiment. Elements that are the same as or similar to those in FIG. 2 are denoted by the same reference numerals, and detailed descriptions thereof are not given hereinafter. The vehicle control apparatus 10A is mounted on, for example, a vehicle 1 that is used for passenger transportation and is autonomously driven, similarly to the vehicle control apparatus 10 in the first embodiment. The vehicle 1 is, for example, an autonomously driven unmanned taxy or the like. The vehicle 1 may or may not include the observer 20 and the human detector 30. In the present embodiment, a description will be given assuming that the vehicle 1 does not have the observer 20 and the human detector 30, and the vehicle control apparatus 10A has functions of the observer 20 and the human detector 30.

The vehicle control apparatus 10A illustrated in FIG. 6 includes an observer 20A, a human detector 30A, a selector 101A, a state acquirer 102A, the changer 103, the traveling controller 104, the information output unit 105, a determiner 106, a surrounding-information acquirer 107, a creator 108, a storage unit 109, and a rule updater 110.

<Observer 20A>

The observer 20A obtains sensing information about surroundings of the vehicle 1 by sensing the surroundings of the vehicle 1. In the present embodiment, the observer 20A obtains, in addition to the functions of the observer 20, GPS information indicating the position of the vehicle 1 as sensing information. Since others are analogous to those of the observer 20 in the first embodiment, descriptions thereof are omitted.

<Human Detector 30A>

The human detector 30A detects humans who are present around the vehicle 1 from the sensing information obtained by the observer 20A. In the present embodiment, the human detector 30A obtains, from the sensing information obtained by the observer 20A, for example, an image resulting from photography around the vehicle 1. By detecting humans shown in the obtained image, the human detector 30A detects the humans who are present around the vehicle 1.

Now, a description will be given in conjunction with an example of human detection processing performed by the human detector 30A.

Figure 7A:
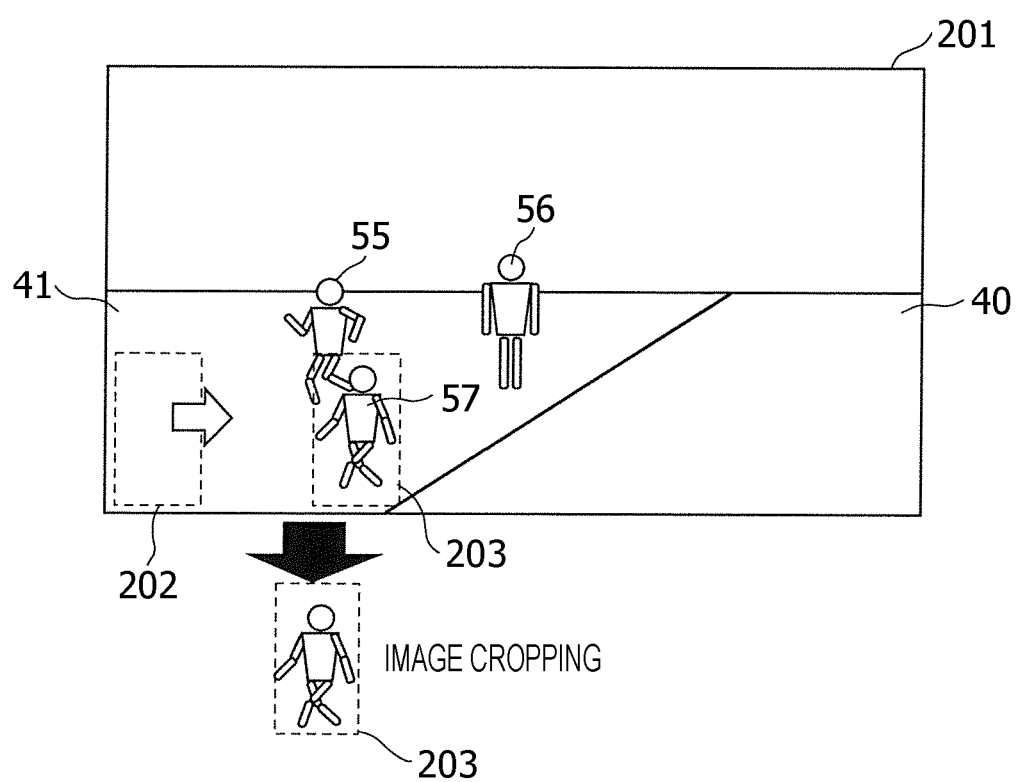
FIG. 7A is a diagram illustrating one example of human detection processing performed by a human detector according to the second embodiment.
Figure 7B:
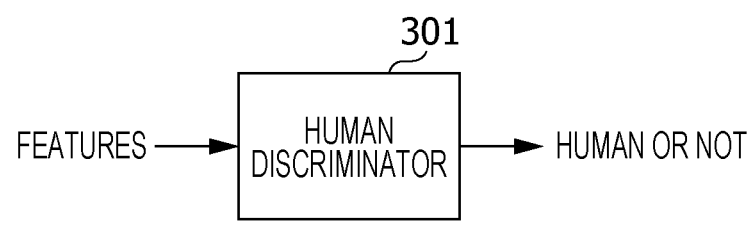
FIG. 7B is a diagram illustrating one example of the human detection processing performed by the human detector according to the second embodiment.

FIGS. 7A and 7B are diagrams illustrating one example of the human detection processing performed by the human detector 30A according to the second embodiment. An image 201 illustrated in FIG. 7A is an example in which humans 55, 56, and 57 are shown on a sidewalk 41 of a road 40 and the sidewalk 41.

The human detector 30A obtains, for example, the image 201 illustrated in FIG. 7A from the observer 20A and causes a detection-target region having a predetermined size and indicated by a region 202 to move. In the example illustrated in FIG. 7A, the human detector 30A crops an image in the detection-target region denoted by a region 203 and extracts features, such as a HOG, from the cropped image. By using the extracted features, the human detector 30A performs processing for identifying whether or not a human is present in the image in the detection-target region denoted by the region 203. The human detector 30A can detect the humans 55, 56, and 57 shown in the image, as described above. The human detector 30A may also perform processing for identifying whether or not a human is present in the image in the detection-target region, for example, by using a human discriminator 301 that has pre-learned features of humans, as illustrated in FIG. 7B. In the example illustrated in FIG. 7B, by using the human discriminator 301, the human detector 30A identifies that the human 57 is present in the image in the detection-target region denoted by the region 203. Similarly, by using the human discriminator 301, the human detector 30A identifies that the humans 55, 56, and 57 are present.

<Surrounding-Information Acquirer 107>

The surrounding-information acquirer 107 acquires environment information about the surroundings of the vehicle 1, based on the sensing information obtained by the observer 20. In the present embodiment, the surrounding-information acquirer 107 acquires the position of the vehicle 1, such as GPS information, from the sensing information obtained by the observer 20 and acquires environment information based on the position, such as weather information and a precipitation probability for the position. The surrounding-information acquirer 107 can acquire the environment information by communicating with, for example, a server or the like external to the vehicle 1. In addition, the surrounding-information acquirer 107 acquires environment information about the surroundings of the vehicle 1, such as the presence/absence of actual rain in the surroundings of the vehicle 1, the presence/absence of other vehicles ahead of and behind the vehicle 1, and a congestion situation of a driving lane in which the vehicle 1 is traveling, from the sensing information obtained by the observer 20.

The environment information based on the position and the environment information about the surroundings of the vehicle 1 are not limited to the above-described examples. For example, the environment information based on the position is not limited to the weather information and the precipitation probability and may be meteorological information, such as pollen information, humidity information, and air temperature information. Also, the environment information about the surroundings of the vehicle 1 may also be the situation of the surroundings, such as an actual air temperature, a humidity, and the amount of pollen in the surroundings of the vehicle 1 and the state of a road surface on which the vehicle 1 travels.

<Creator 108>

The creator 108 creates verification data, based on human information indicating attributes and actions of humans who are present around the vehicle 1, the human information being obtained from the sensing information from the observer 20 and the environment information acquired by the surrounding-information acquirer 107.

In the present embodiment, the creator 108 generates verification data that the selector 101A uses in order to select a target person. Specifically, the creator 108 first identifies human information indicating attributes and actions of humans that the human detector 30A detected, for example, from an image included in the sensing information and obtained by photography around the vehicle 1. The creator 108 creates verification data in which the identified human information and the environment information acquired by the surrounding-information acquirer 107 are constructed by pre-defined numerals or symbols. The human information refers to, for example, attributes that are human personal information, such as a gender, age, and height, and human actions, such as walking, being still, jogging, dog walking, and shopping. Human information identifying processing performed by the creator 108 will be described below with reference to the drawings.

Figure 8A:
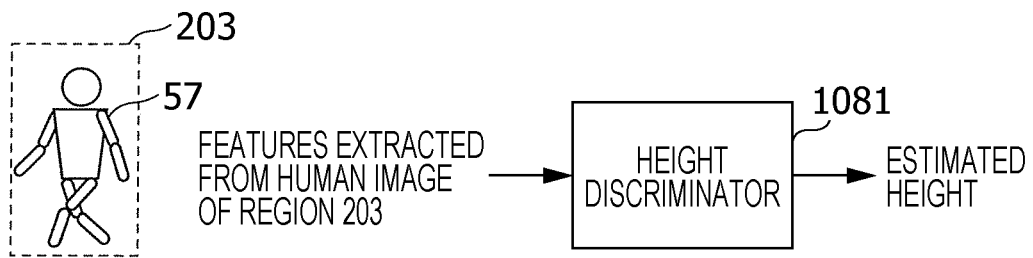
FIG. 8A is a diagram illustrating one example of attribute identification processing performed by a creator according to the second embodiment.
Figure 8B:
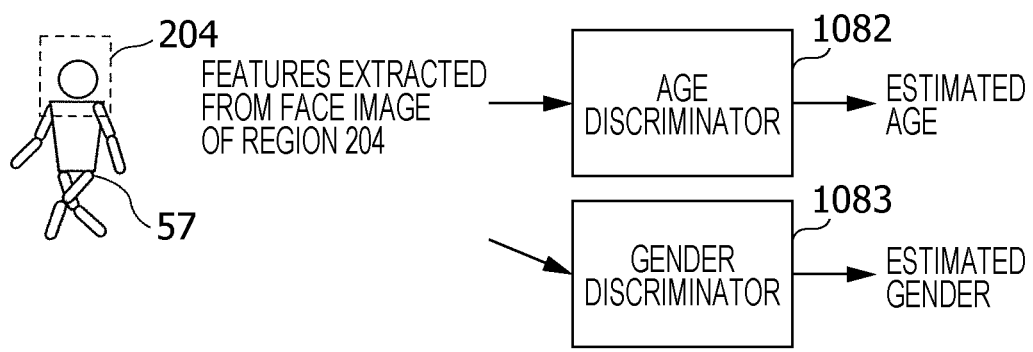
FIG. 8B is a diagram illustrating one example of the attribute identification processing performed by the creator according to the second embodiment.

FIGS. 8A and 8B are diagrams each illustrating one example of attribute identification processing performed by the creator 108 according to the second embodiment. The creator 108 extracts features from a human image including the human 57, for example, as in an image denoted by the region 203 illustrated in FIG. 8A. The creator 108 may estimate the height of the human 57 from the extracted features, for example, by using a height discriminator 1081 that has pre-learned features of height-specific humans. Also, the creator 108 extracts features from a face image including the face of the human 57, for example, as in an image denoted by a region 204 illustrated in FIG. 8B. The creator 108 may estimate the age of the human 57 from the extracted features, for example, by using an age discriminator 1082 that has pre-learned features of the faces of age-specific humans. The creator 108 may estimate the gender of the human 57 from the extracted features, for example, by using a gender discriminator 1083 that has pre-learned features of the faces of gender-specific humans.

Figure 8C:
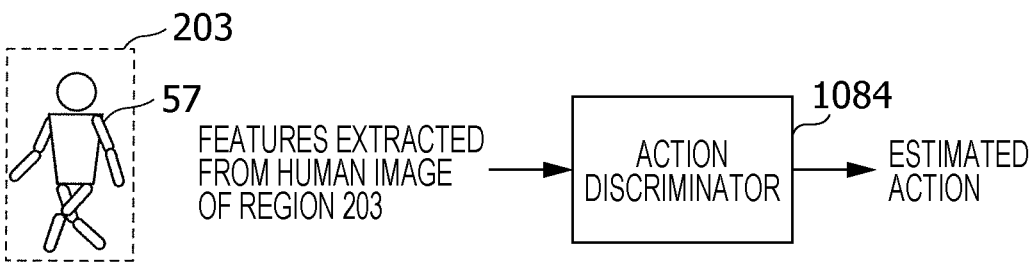
FIG. 8C is a diagram illustrating one example of action identification processing performed by the creator according to the second embodiment.

FIG. 8C is a diagram illustrating one example of action identification processing performed by the creator 108 according to the second embodiment. The creator 108 extracts features from a human image including the human 57, for example, as in the image denoted by the region 203 illustrated in FIG. 7A. The creator 108 may estimate an action of the human 57 from the extracted features, for example, by using an action discriminator 1084 that has pre-learned features of action-specific humans, as illustrated in FIG. 8C.

The human information may further include a walking speed, personal belongings, a group to which the human belongs, and the number of humans, in addition to the above-described example.

<Storage Unit 109>

The storage unit 109 is implemented by, for example, a storage device, such as a Secure Digital (SD) card or a flash memory, and in the present embodiment, the storage unit 109 stores a selection rule used for selecting a target person.

The storage unit 109 also stores and accumulates verification data created by the creator 108 and determination results of the determiner 106. The determination results may be associated with the verification data. The selection rule indicates, for example, priorities with respect to combinations of human information indicating attributes and actions of humans and environment information.

FIG. 9A is a table illustrating one example of the selection rule according to the second embodiment. FIG. 9B is a table illustrating another example of the selection rule according to the second embodiment.

As illustrated in FIG. 9A, the selection rule indicates priorities with respect to, for example, combinations of human attributes, such as genders and ages, human actions, such as walking, being still, and jogging, and environment information about precipitation probabilities (%) and the presence/absence of rain.

The selection rule is not limited to the case illustrated in FIG. 9A, and as illustrated in FIG. 9B, an item having content of a ride recommendation for urging the target person to ride in may be added to the items illustrated in FIG. 9A. Thus, when the selector 101A, described below, selects a target person based on the priorities, the content of the ride recommendation for the target person, the content being output by the information output unit 105, is also selected.

Also, the selection rule may also specify, for example, priorities based on positional relationships between the vehicle 1 and target people, such as a rule that gives high priority to a human who can see the vehicle 1 and who is relatively close in distance, as described above in the first embodiment.

<Selector 101A>

The selector 101A selects a target person who is at least one of humans who are present around the vehicle 1 and are detected using the sensing information about the surroundings of the vehicle 1. More specifically, the selector 101A selects a target person by using the selection rule and the verification data created from the sensing information about the surroundings of the vehicle 1 and the attributes and actions of humans who are present around the vehicle 1.

In the present embodiment, the selector 101A performs processing for verifying the verification data created by the creator 108 with the selection rule stored in the storage unit 109 to thereby select at least one target person out of humans, such as pedestrians, who are present around the vehicle 1 and are detected by the human detector 30. The following description will be given of a case in which the selector 101A performs verification processing by using the selection rule illustrated in FIG. 9A or 9B.

Figure 10A:
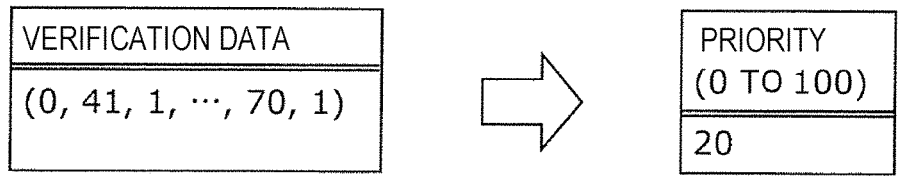
FIG. 10A is a table illustrating one example of verification processing in a selector according to the second embodiment.
Figure 10B:
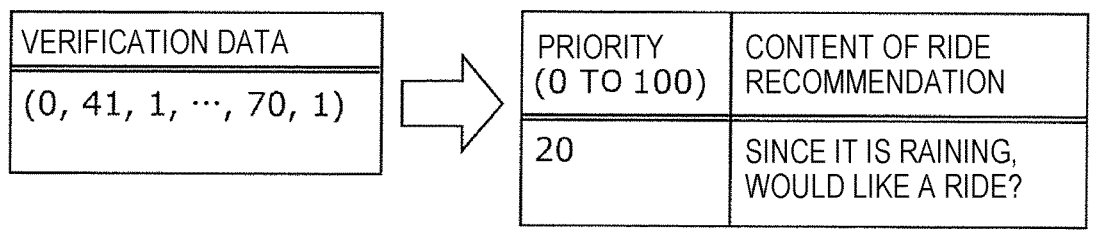
FIG. 10B is a table illustrating another example of the verification processing in the selector according to the second embodiment.

FIG. 10A is a table illustrating one example of the verification processing in the selector 101A according to the second embodiment. FIG. 10B is a table illustrating another example of the verification processing in the selector 101A according to the second embodiment. One example of the verification data is illustrated at the left side in FIGS. 10A and 10B, and verification results are illustrated at the right side therein. FIGS. 10A and 10B illustrate an example in which the verification data is constituted by numerals of elements that are arrayed in a row. The numerals of the elements that are arrayed in a row indicate, from the left, a gender indicated by 0 or 1, an age indicated by a numeral, an action indicated by 1 to 3, a precipitation probability indicated by 1 to 100, and the presence/absence of rain indicated by 0 or 1.

With respect to one of humans who are present around the vehicle 1 and are detected by the human detector 30, the selector 101A verifies the verification data created by the creator 108 with the selection rule illustrated in FIG. 9A or 9B, to thereby obtain a priority for the verification data as a verification result. The selector 101A may perform such verification processing on all of the humans who are present around the vehicle 1 and are detected by the human detector 30, to select, for example, a human having the highest priority as a target person. Also, the selector 101A may perform such verification processing on each randomly or sequentially selected human of the humans who are present around the vehicle 1 and are detected by the human detector 30 and may select a target person when the priority for the selected human is higher than or equal to a predetermined threshold.

<State Acquirer 102A>

The state acquirer 102A acquires the first state indicating the position, the movement direction, and the movement speed of the target person selected by the selector 101A. In addition, the state acquirer 102A may acquire motion or an action of the target person selected by the selector 101A.

In the present embodiment, the state acquirer 102A acquires the state of the target person and the state of the vehicle 1, similarly to the above-described state acquirer 102. The state acquirer 102A further acquires motion and an action of the target person, based on the sensing information obtained by the observer 20A. For example, the state acquirer 102A acquires, as the motion and action of the target person, at least one of a change in the direction of the target person relative to the vehicle 1, a change in the speed of the target person, motion of the hands of the target person, motion of the head of the target person, and content indicated by voice information of the target person.

<Determiner 106>

Based on the motion or the action of the target person after the information output unit 105 outputs the recommendation information, the determiner 106 determines whether or not the target person has an intension of riding in the vehicle 1. The motion or the action may include at least one of a change in the direction of the target person relative to the vehicle 1, a change in the speed of the target person, motion of the hands of the target person, motion of the head of the target person, and content indicated by voice information of the target person. Upon determining that the target person has an intension of riding in the vehicle 1, the determiner 106 outputs a notification indicating that it has an intension of accepting the riding to the traveling controller 104.

In the present embodiment, the determiner 106 includes a first determiner 1061 and a second determiner 1062. The first determiner 1061 determines, for example, an explicit action of the target person, such as raising a hand, calling, or waving his/her hand away, to thereby determine whether or not the target person has an intension of riding in the vehicle 1. Although the first determiner 1061 determines the presence/absence of an explicit action of the target person by using the action and motion of the target person which are obtained by the state acquirer 102A, the present disclosure is not limited thereto. When the state acquirer 102A does not obtain an action and motion of the target person, the first determiner 1061 may obtain an action and motion of the target person selected by the selector 101A and determine the presence/absence of an explicit action of the target person, based on the sensing information obtained by the observer 20A. The second determiner 1062 determines whether or not the target person has an intension of riding in the vehicle 1, for example, by determining the presence/absence of the target person's gesture for riding in, such as stopping walking, looking at the vehicle 1, nodding, shaking his/her head, that is, the presence/absence of an implicit action of the target person. The second determiner 1062 determines the presence/absence of an implicit action of the target person by using the first state of the target person which is acquired by the state acquirer 102A. Upon determining that the target person has an intension of riding in the vehicle 1, the first determiner 1061 and the second determiner 1062 output, to the traveling controller 104, a notification indicating that it will accept the riding.

<Rule Updater 110>

The rule updater 110 updates the selection rule, based on the verification data indicating the attributes and actions of humans who have been selected as the target people and who have ever ridden in the vehicle 1.

In the present embodiment, the rule updater 110 gives feedback corresponding to a determination result of the determiner 106 to the selection rule. For example, when a certain number of target people corresponding to verification data having a high priority in the selection rule do not show riding intensions, the rule updater 110 reduces the priority. Also, when a certain number of target people corresponding to verification data having a relatively low priority in the selection rule show riding intensions, the rule updater 110 increases the priority. With such an arrangement, the rule updater 110 can update the selection rule so that it becomes a selection rule to which the determination results have been fed back. When the number of pieces of verification data stored in the storage unit 109 and the number of determination results each reach a certain number, the rule updater 110 may adjust the priorities in the selection rule by performing statistical processing on the certain number of determination results.

[Operation of Vehicle Control Apparatus 10A]

Next, the following description will be given of the operation of the vehicle control apparatus 10A configured as described above.

Figure 11:
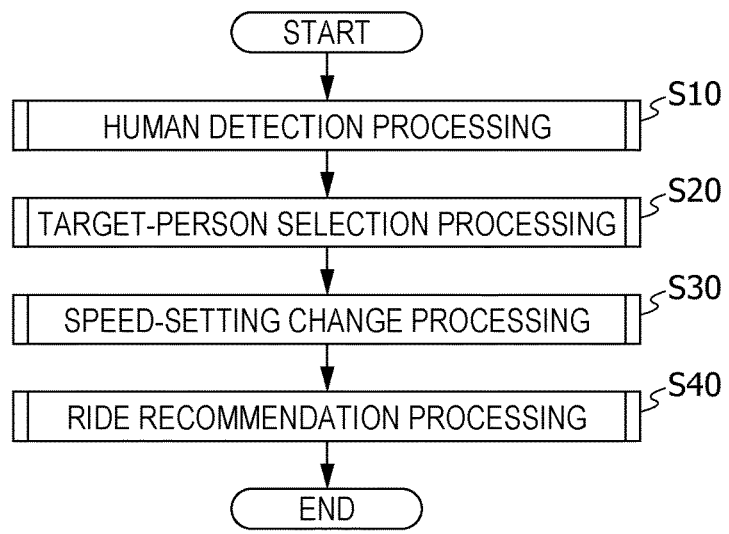
FIG. 11 is a flowchart illustrating an overview of the operation of the vehicle control apparatus according to the second embodiment.

FIG. 11 is a flowchart illustrating an overview of the operation of the vehicle control apparatus 10A according to the second embodiment. That is, first, the vehicle control apparatus 10A performs human detection processing for detecting humans who are present around the vehicle 1 (S10). Next, the vehicle control apparatus 10A performs target-person selection processing for selecting a target person who is at least one of humans who are present around the vehicle 1 detected in S10 (S20). Next, the vehicle control apparatus 10A performs speed-setting change processing for changing a speed setting of the vehicle 1 in accordance with the state of the target person selected in S20 (S30). Next, the vehicle control apparatus 10A performs ride recommendation processing for making a ride recommendation to the target person (S40).

Figure 12:
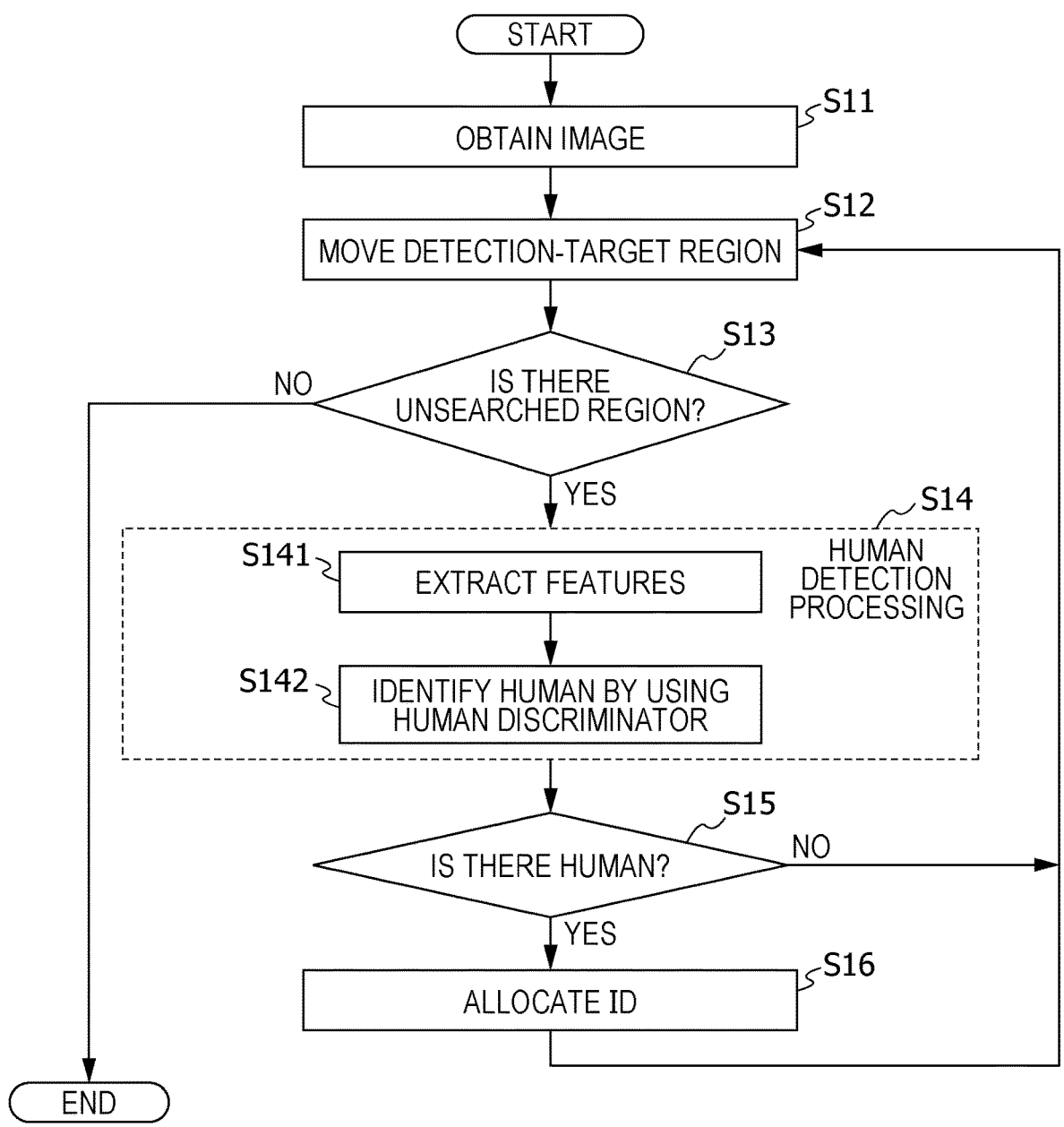
FIG. 12 is a flowchart illustrating one example of details of an operation in S10 illustrated in FIG. 11.

FIG. 12 is a flowchart illustrating one example of details of the operation in S10 illustrated in FIG. 11.

In S10, first, the vehicle control apparatus 10A obtains, from sensing information obtained by sensing the surroundings of the vehicle 1, an image resulting from photography around the vehicle 1 (S11).

Subsequently, the vehicle control apparatus 10A causes a detection-target region to move in the image obtained in S11 (S12), and when it is an unsearched region (YES in S13), the vehicle control apparatus 10A performs human detection processing on an image in the detection-target region at a position to which it has moved (S14). In S14, the vehicle control apparatus 10A extracts features, such as a HOG, from the image in the detection-target region at the position to which it has moved (S141) and identifies a human from the extracted features by using a human discriminator (S142). When there is no unsearched region in the image in S13 (NO in S13), the processing ends.

Subsequently, when the human detection processing in S14 identifies a human in the image in the detection-target region at the position (YES in S15), the vehicle control apparatus 10A allocates an identifier (ID) to the identified human (S16) and returns to the process in S12. On the other hand, when the human detection process in S14 does not identify a human in the image in the detection-target region at the position (NO in S15), the vehicle control apparatus 10A returns to the process in S12 without performing the process in S16.

The vehicle control apparatus 10A obtains, from the sensing information obtained by sensing the surroundings of the vehicle 1 in S10 in the manner described above, an image resulting from photography around the vehicle 1 and information about the ID(s) that is (are) allocated to one or more regions in the image and that indicate(s) the human(s).

Figure 13:
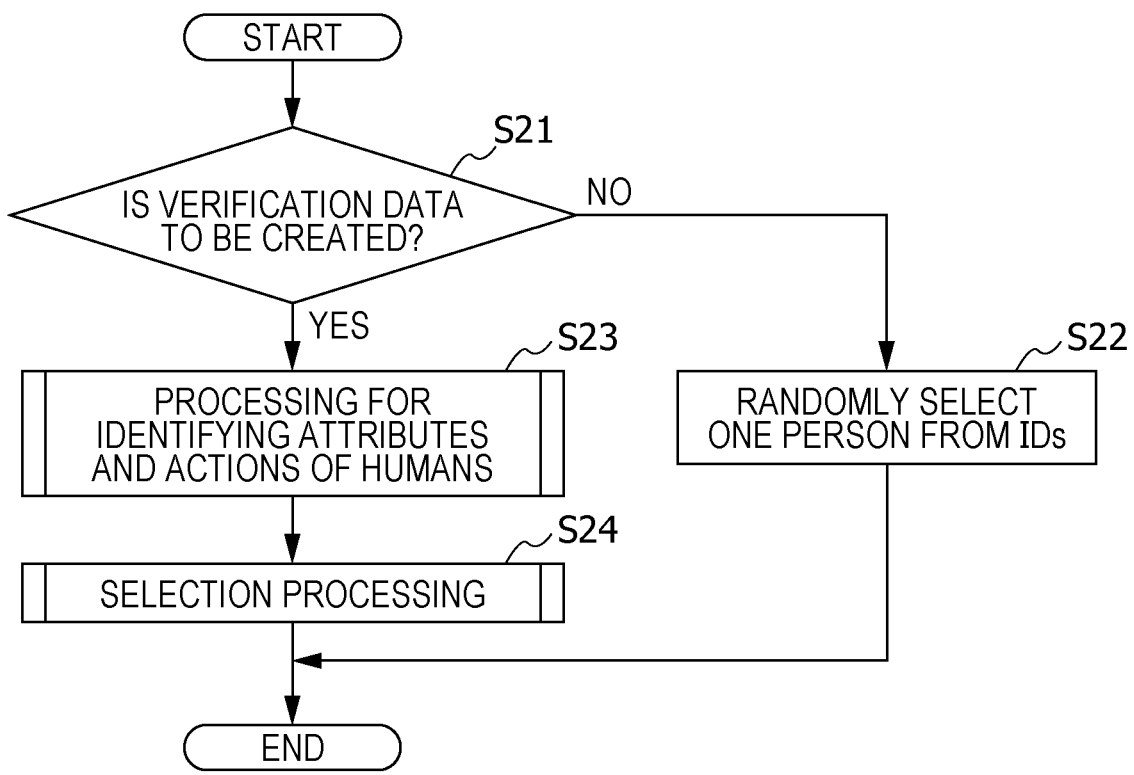
FIG. 13 is a flowchart illustrating one example of details of an operation in S20 illustrated in FIG. 11.

FIG. 13 is a flowchart illustrating one example of details of the operation in S20 illustrated in FIG. 11.

In S20, first, the vehicle control apparatus 10A decides whether or not the verification data is to be created (S21). When the verification data is not to be created (NO in S21), the vehicle control apparatus 10A randomly selects one person from IDs obtained in the processing in S20 (S22) and allocated to one or more regions in the image and ends the processing. On the other hand, when verification data is to be created (YES in S21), the vehicle control apparatus 10A performs processing for identifying attributes and actions of humans in the image who were detected in the processing in S20 (S23) and performs selection processing for selecting a target person who is at least one of the humans in the image who were detected in the processing in S20 (S24).

Figure 14:
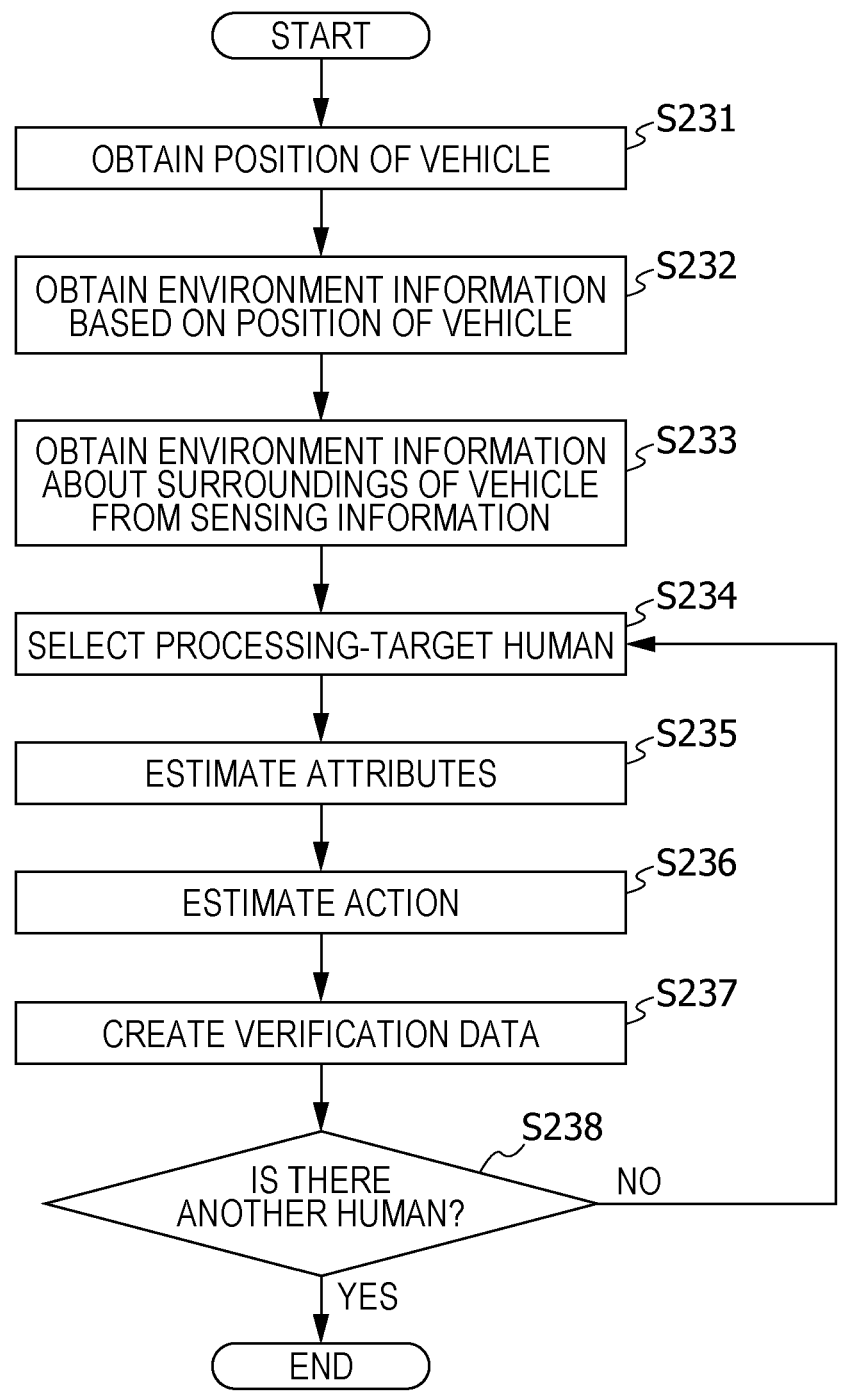
FIG. 14 is a flowchart illustrating one example of details of an operation in S23 illustrated in FIG. 13.

FIG. 14 is a flowchart illustrating one example of details of the operation in S23 illustrated in FIG. 13.

In S23, first, the vehicle control apparatus 10A obtains the position of the vehicle 1 from the sensing information obtained by sensing the surroundings of the vehicle 1 (S231) and obtains environment information based on the position (S232).

Subsequently, the vehicle control apparatus 10A obtains environment information about the surroundings of the vehicle 1 from the sensing information (S233).

Subsequently, the vehicle control apparatus 10A selects one of the humans in the image who were detected in the process in S20, that is, selects a processing-target human (S234). The vehicle control apparatus 10A estimates attributes and an action of the selected processing-target human (S235 and S236). The order of the processes in S235 and S236 may be a reverse order of that order.

Subsequently, the vehicle control apparatus 10A creates the verification data by using the attributes and the action of the processing-target human estimated in S235 and S236 and the environment information obtained in S232 and S233 (S237). When there is no other human, that is, when there is no human other than the processing-target human of the humans in the image who were detected in the process in S20 (YES in S238), the processing ends. When there is another human (NO in S238), the process returns to S234, and the processing is repeated.

Figure 15:
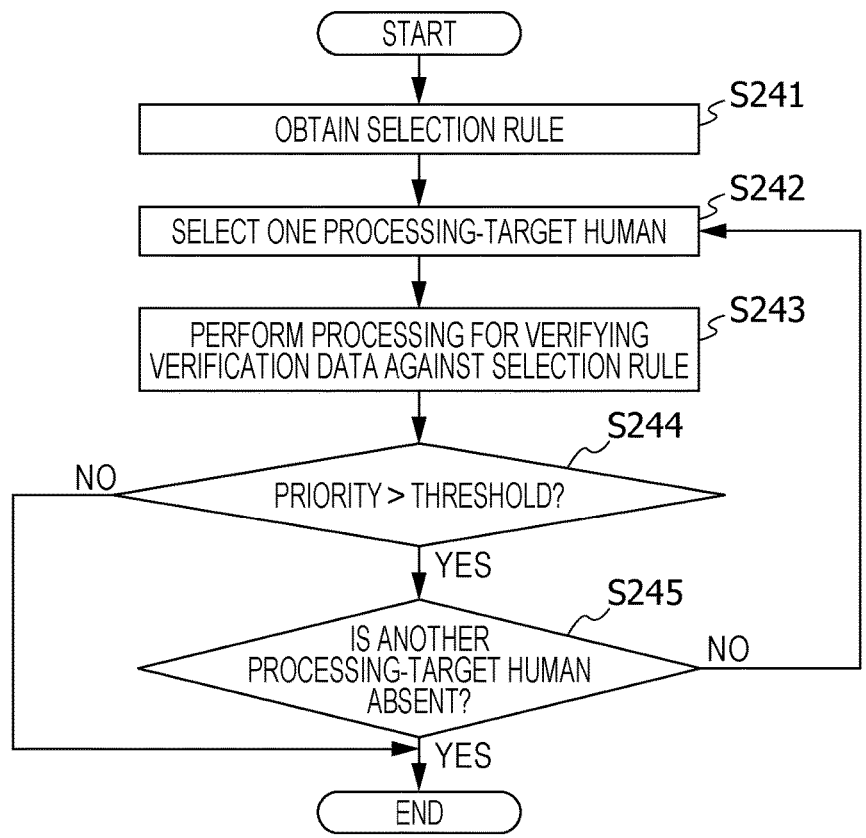
FIG. 15 is a flowchart illustrating one example of details of an operation in S24 illustrated in FIG. 13.

FIG. 15 is a flowchart illustrating one example of details of the operation in S24 illustrated in FIG. 13.

In S24, first, the vehicle control apparatus 10A obtains the selection rule stored in the storage unit 109 (S241).

Subsequently, the vehicle control apparatus 10A selects one of the humans in the image who were detected in the process in S20, that is, selects a processing-target human (S242).

Subsequently, with respect to the processing-target human selected in S242, the vehicle control apparatus 10A performs processing (S243) for verifying the verification data created in the process in S23 against the selection rule obtained in S241, to obtain a priority for the processing-target human selected in S242.

Subsequently, when the priority for the processing-target human, the priority being obtained in the verification processing in S243, is higher than a threshold (YES in S244), the vehicle control apparatus 10A selects the processing-target human as a target person.

Even when the priority for the processing-target human, the priority being obtained in the verification processing in S243, is lower than or equal to the threshold (NO in S244), the vehicle control apparatus 10A selects the processing-target human as a target person when another processing-target human is absent (YES in S245).

Also, when the priority for the processing-target human, the priority being obtained in the verification processing in S243, is lower than or equal to the threshold (NO in S244), and another processing-target human is present (NO in S245), the vehicle control apparatus 10A returns to S242 to select a new processing-target human and repeats the processes in and after S243.

Figure 16:
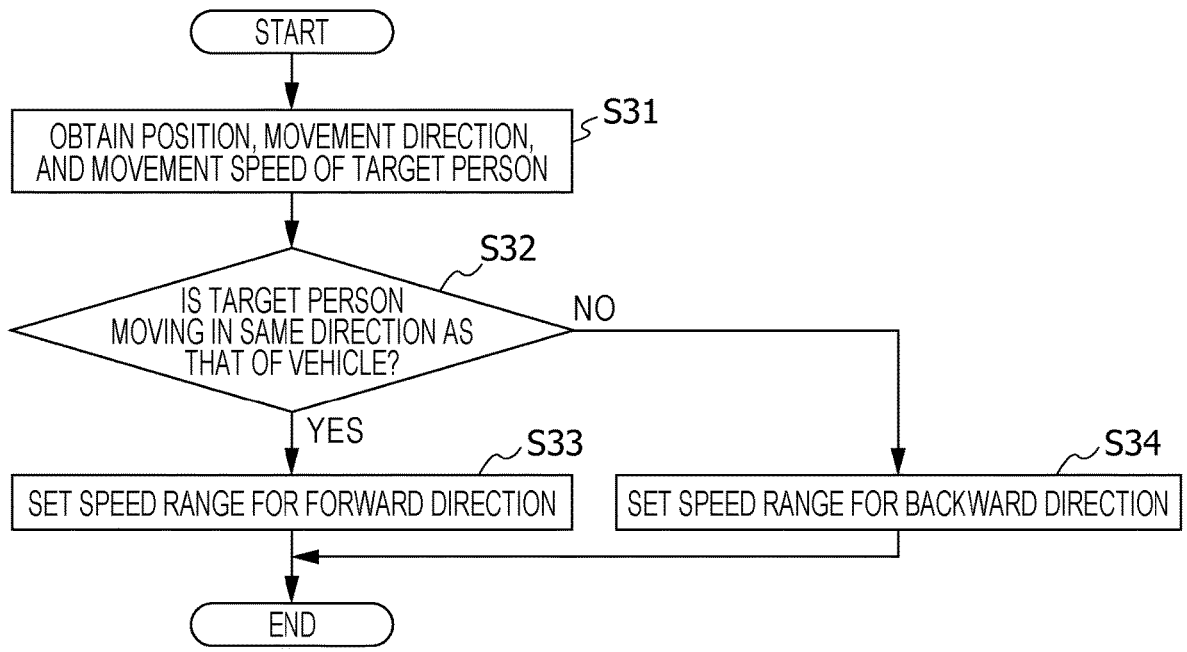
FIG. 16 is a flowchart illustrating one example of details of an operation in S30 illustrated in FIG. 11.

FIG. 16 is a flowchart illustrating one example of details of the operation in S30 illustrated in FIG. 11.

In S30, first, the vehicle control apparatus 10A obtains the state of the target person selected in S20 which indicates the position, the movement direction, and the movement speed of the target person (S31).

Subsequently, by using the state of the target person, the vehicle control apparatus 10A determines whether or not the target person is moving in the same direction as that of the vehicle 1 (S32). More specifically, the vehicle control apparatus 10A determines whether or not the movement direction of the target person is the same as the movement direction of the vehicle 1.

When it is determined in S32 that the target person is moving in the same direction as that of the vehicle 1 (YES in S32), the vehicle control apparatus 10A sets a speed range for a forward direction (S33). Specifically, when the target person is moving in the same direction as that of the vehicle 1, the vehicle control apparatus 10A changes the speed setting of the vehicle 1 so as to reach a speed that is higher than or equal to the moving speed of the target person in order to cause the vehicle 1 to travel side-by-side with the target person. On the other hand, when the target person is not moving in the same direction as that of the vehicle 1 (NO in S32), the vehicle control apparatus 10A sets a speed range for a backward direction (S34). Specifically, when the target person is moving in a direction different from that of the vehicle 1, the vehicle control apparatus 10A changes the speed setting of the vehicle 1 so as to cause the vehicle 1 to slow down or stop temporarily.

Figure 17:
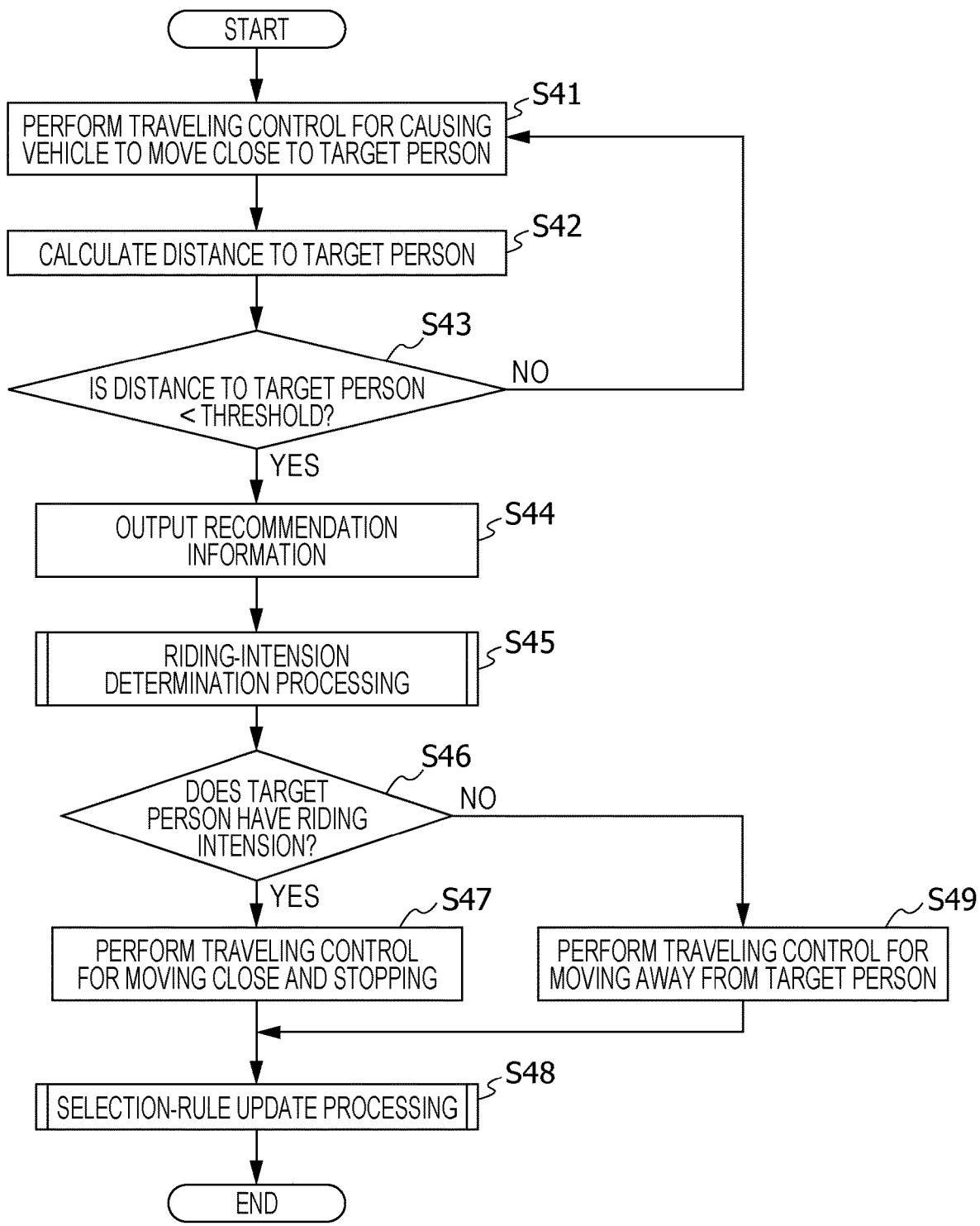
FIG. 17 is a flowchart illustrating one example of details of an operation in S40 illustrated in FIG. 11.

FIG. 17 is a flowchart illustrating one example of details of the operation in S40 illustrated in FIG. 11.

In S40, first, the vehicle control apparatus 10A calculates a distance from the vehicle 1 to the target person (S42) while performing traveling control for causing the vehicle 1 to move close to the target person with the speed indicated by the speed setting changed in S30 (S41).

Subsequently, the vehicle control apparatus 10A determines whether or not a distance from the vehicle 1 to the target person is smaller than a threshold (S43), and when the distance is smaller than the threshold (YES in S43), the vehicle control apparatus 10A outputs recommendation information indicating a ride recommendation to the target person (S44). When the distance is larger than or equal to the threshold (NO in S43), the process returns to S41, and the processing is repeated.

Subsequently, the vehicle control apparatus 10A performs processing for determining a riding intension of the target person (S45), and upon determining that the target person has a riding intension (YES in S46), the vehicle control apparatus 10A performs traveling control for causing the vehicle 1 to move close to the target person and stop (S47).

Subsequently, the vehicle control apparatus 10A performs selection-rule update processing for feeding back the determination result in S46 (S48).

Upon determining that the target person has no riding intension in S46 (NO in S46), the vehicle control apparatus 10A performs traveling control for returning to the speed before the processing in S30 (S49) to move away from the target person and proceeds the process in S48.

Figure 18:
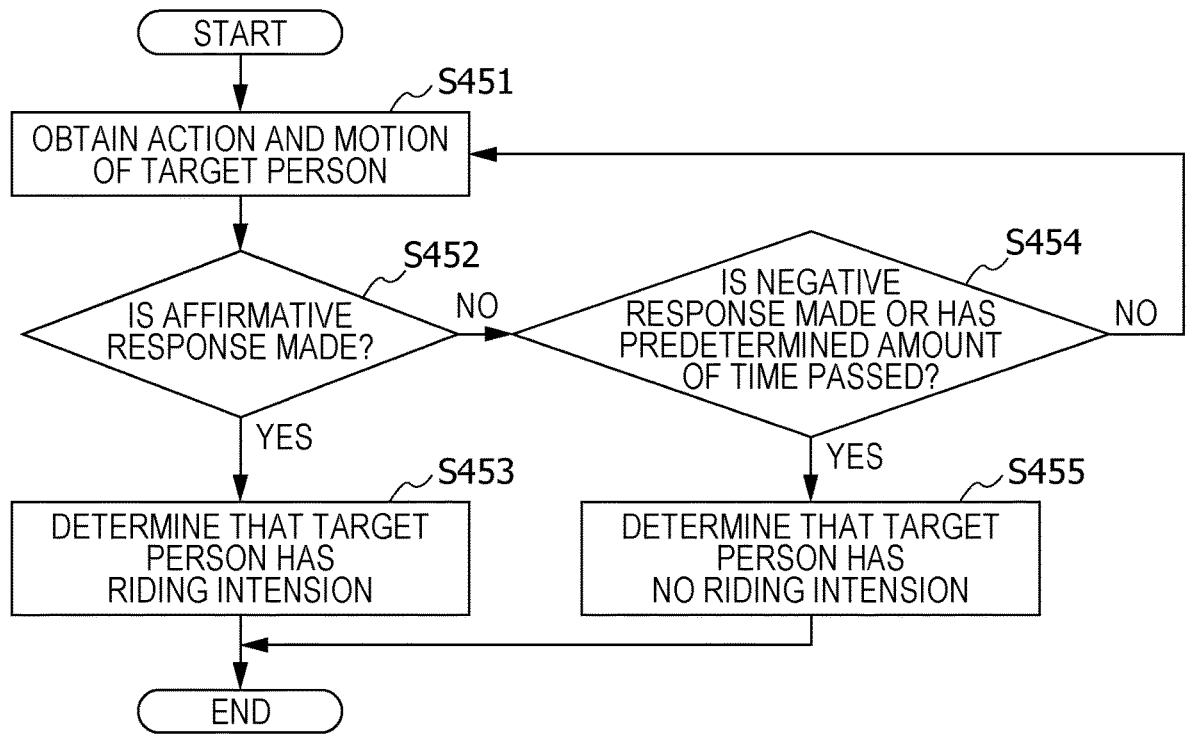
FIG. 18 is a flowchart illustrating one example of details of an operation in S45 illustrated in FIG. 17.

FIG. 18 is a flowchart illustrating one example of details of the operation in S45 illustrated in FIG. 17.

In S45, first, the vehicle control apparatus 10A obtains an action and motion of the target person, based on the sensing information about the surroundings of the vehicle 1 (S451).

Subsequently, based on the target person's action and motion obtained in S451, the vehicle control apparatus 10A determines whether or not the target person is making an affirmative response to the recommendation information indicating the ride recommendation (S452). The affirmative response refers to, for example, the target person raising a hand toward the vehicle 1, nodding in response to the recommendation information, and performing an affirmative utterance in response to the recommendation information.

Upon determining that the target person is making an affirmative response in S452 (YES in S452), the vehicle control apparatus 10A determines that the target person has a riding intension (S453).

On the other hand, upon determining that the target person does not show an affirmative response in S452 (NO in S452), the vehicle control apparatus 10A determines that the target person is making a negative response or a certain amount of time has passed (S454). The negative response refers to, for example, the target person waving his/her hand away toward the vehicle 1, shaking his/her head in response to the recommendation information, or performing a negative utterance in response to the recommendation information.

Upon determining that the target person is making a negative response in S454 or a certain amount of time has passed (YES in S454), the vehicle control apparatus 10A determines that the target person has no riding intension (S455). When the vehicle control apparatus 10A cannot determine that the target person is making a negative response or the certain amount of time has passed in S454 (NO in S454), the process returns to S451, and the processing is repeated.

Figure 19:
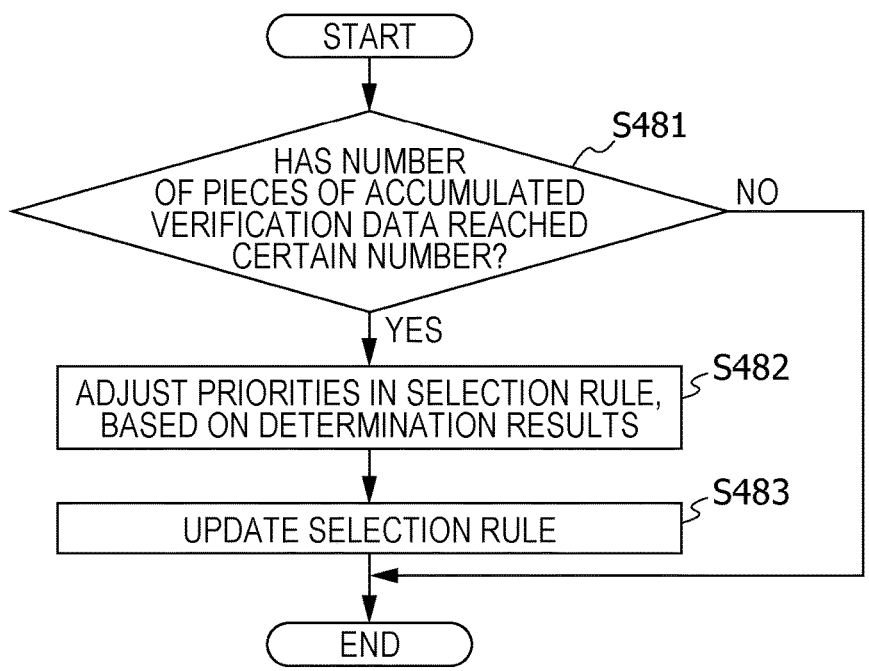
FIG. 19 is a flowchart illustrating one example of details of an operation in S48 illustrated in FIG. 17.

FIG. 19 is a flowchart illustrating one example of details of the operation in S48 illustrated in FIG. 17.

In S48, first, the vehicle control apparatus 10A determines whether or not the number of pieces of accumulated verification data has reached a certain number (S481). When the number of pieces of accumulated verification data has not reached the certain number in S481 (NO in S481), the vehicle control apparatus 10A ends the processing without updating the selection rule.

On the other hand, when the number of pieces of accumulated verification data has reached the certain number in S481 (YES in S481), the vehicle control apparatus 10A adjusts the priorities in the selection rule, based on the accumulated determination results (S482). Although various methods are available as the priority adjustment method, the priorities may be adjusted, for example, by performing statistical processing on the accumulated determination results and the verification data corresponding thereto.

Subsequently, the vehicle control apparatus 10A updates the selection rule so that the priorities adjusted in S482 are set (S483).

[Advantages, Etc.]

According to the present embodiment, it is possible to realize a vehicle control apparatus and a vehicle control method that can improve the efficiency of energy consumed by vehicles used for passenger transportation.

Also, according to the vehicle control apparatus and so on in the present embodiment, since the speed control of the vehicle 1 can be performed according to the state of a target person who is a passenger candidate, and the recommendation information can be output, it is possible to make the passenger candidate notice the proactive access, and it is possible to urge the passenger candidate to ride in. In addition, according to the vehicle control apparatus and so on in the present embodiment, after the recommendation information is output, the vehicle 1 can be moved close to a target person in accordance with an affirmative response of the target person, thus making it possible to urge the target person to smoothly ride therein. This makes it possible to efficiently increase the number of passengers in the vehicle 1 having the vehicle control apparatus and so on in the present embodiment. Also, the target person can reduce the amount of work and time for looking for the vehicle 1 in which he or she can ride. In addition, there is also an advantage that the target person can stop the vehicle 1 and ride therein even under a situation in which it is difficult to stop the vehicle 1 that is traveling on a road.

As described above, the vehicle 1 having the vehicle control apparatus and so on in the present embodiment can improve the occupancy rate by getting passengers therein even at places other than predetermined places, such as taxi stands, thus making it possible to improve the efficiency of energy consumed for moving the vehicle 1.

(Other Modifications)

Although the above description has been given of a vehicle control apparatus, a vehicle control method, and so on according to one or more aspects of the present disclosure, the present disclosure is not limited to the embodiments. Modes obtained by applying various modifications conceived by those skilled in the art to the embodiments or modes constituted by combining the constituent elements in different embodiments may also be encompassed by the scope of one or more aspects of the present disclosure, as long as such modes do not depart from the spirit of the present disclosure. For example, the present disclosure includes cases as described below.

(1) Each apparatus described above is, specifically, a computer system including a microprocessor, a ROM, a random-access memory (RAM), a hard disk unit, a display unit, a keyboard, a mouse, and so on. A computer program is stored in the RAM or the hard disk unit. The microprocessor operates in accordance with the computer program, so that each apparatus realizes its functions. The computer program in this case is a combination of a plurality of instruction codes for giving instructions to a computer in order to achieve a predetermined function.

(2) One or more of the constituent elements included in each apparatus described above may be implemented by a single system large-scale integration (LSI) circuit. The system LSI is a super-multifunctional LSI circuit manufactured by integrating a plurality of constituent portions on one chip and is, specifically, a computer system includes a microprocessor, a ROM, a RAM, and so on. A computer program is stored in the RAM. The microprocessor operates in accordance with the computer program, so that the system LSI realizes its functions.

(3) One or more of the constituent elements included in each apparatus described above may be implemented by an integrated circuit (IC) card or a single module that can be inserted into and removed from the apparatus. The IC card or the module may be a computer system constituted by a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(4) The present disclosure may also be implemented by the methods described above. Those methods may also be implemented by a computer program realized by a computer or may be implemented with digital signals provided by the computer program. For example, a vehicle control method according to one aspect of the present disclosure is directed to a vehicle control method that controls a vehicle that is autonomously driven and that is used for passenger transportation. The vehicle control method includes: selecting a target person who is at least one of humans who are present around the vehicle and are detected using sensing information about surroundings of the vehicle; acquiring a first state indicating a state of the target person; acquiring a second state indicating a state of the vehicle; changing a speed setting of the vehicle in accordance with the first state and the second state; and controlling traveling of the vehicle at a speed indicated by the speed setting. In addition, for example, a program according to one aspect of the present disclosure is directed to a non-transitory recording medium storing thereon a computer program. The computer program, when executed by a processor, causes the processor to perform operations including: selecting a target person who is at least one of humans who are present around a vehicle that is autonomously driven and that is used for passenger transportation, the humans being detected using sensing information about surroundings of the vehicle; acquiring a first state indicating a state of the target person; acquiring a second state indicating a state of the vehicle; changing a speed setting of the vehicle in accordance with the first state and the second state; and controlling traveling of the vehicle at a speed indicated by the speed setting.

In the present disclosure, the computer program or the digital signals may be recorded on computer-readable recording media, for example, a flexible disk, a hard disk, a CD-ROM, a magneto-optical (MO) disk, a digital versatile disc (DVD), a DVD-ROM, a DVD-RAM, a Blu-ray® Disc (BD), and a semiconductor memory. The present disclosure may also be implemented by the digital signals recorded on the recording media.

Additionally, in the present disclosure, the computer program or the digital signals may be transmitted through a telecommunication channel, a wireless or wired communication channel, and a network typified by the Internet, data broadcasting, and so on.

Also, the present disclosure may be implemented by a computer system including a microprocessor and a memory, the memory may store the computer program, and the microprocessor may operate in accordance with the computer program.

The present disclosure may also be implemented by another independent computer system by transporting the recording medium on which the program or the digital signals are recorded or transferring the program or the digital signals through the network or the like.

(5) The above-described embodiments may also be combined together.

The present disclosure can be utilized for, for example, vehicle control apparatuses, vehicle control methods, and programs utilized for autonomous driving vehicles used in theme parks and so on and for robots and so on that can move with humans on board.

What is claimed is:

1. An apparatus mounted on a vehicle that is autonomously driven and that is used for passenger transportation, the apparatus comprising:
a processor; and
a memory storing thereon a computer program, which when executed by the processor, causes the processor to perform operations including:
obtaining sensing information by sensing surroundings of the vehicle;
detecting humans who are present around the vehicle from the sensing information;
selecting a target person who is at least one of the detected humans;
acquiring a first state indicating a state of the selected target person;
acquiring a second state indicating a state of the vehicle;
changing a speed setting of the vehicle in accordance with the first state and the second state; and
controlling traveling of the vehicle at a speed indicated by the speed setting,
wherein the operations further includes:
storing a plurality of selection rules used for selecting target person, each of the plurality of selection rules including an attribute and an action of a human and a priority associated with each other;
creating verification data of each of the detected humans from the sensing information, the verification data indicating an attribute and an action of each of the detected humans;
comparing the verification data with the plurality of selection rules, and obtaining a priority for the verification data from the priority included in the selection rules;
selecting the target person by using the obtained priority; and
updating the plurality of selection rules by increasing the priority of a first selection rule of the plurality of selection rules, the first selection rule corresponding to the verification data of the selected target person and the target person has ridden in the vehicle.

2. The apparatus according to claim 1,
wherein, of a position, a movement direction, and a movement speed of the target person, at least the position and the movement direction are included in the first state.

3. The apparatus according to claim 1,
wherein, in the changing,
when a movement direction of the target person which is indicated by the first state and a movement direction of the vehicle which is indicated by the second state differ from each other, the speed setting is changed so as to reach a speed for causing the vehicle to stop temporarily or slow down, and
when the movement direction of the target person which is indicated by the first state and the movement direction of the vehicle which is indicated by the second state are the same, the speed setting is changed so as to adjust a speed of the vehicle to the speed of the target person which is indicated by the first state.

4. The apparatus according to claim 1,
the operations further including:
outputting, to the target person, recommendation information indicating a recommendation for riding in the vehicle for performing the passenger transportation, when the traveling is controlled in the controlling, and a distance between the target person and the vehicle becomes smaller than or equal to a threshold.

5. The apparatus according to claim 4,
the operations further including:
determining whether or not the target person has an intension of riding in the vehicle, based on motion or an action of the target person after the recommendation information is output in the outputting.

6. The apparatus according to claim 5,
wherein the motion or the action includes at least one of a change in a direction of the target person relative to the vehicle, a change in a speed of the target person, motion of a hand of the target person, motion of the head of the target person, and content indicated by voice information of the target person.

7. The apparatus according to claim 1,
the operations further including:
> obtaining environment information about the surroundings of the vehicle, based on the sensing information, and
> creating the verification data, based on human information indicating the attribute and the action of each of the detected humans who are present around the vehicle and the environment information.

8. A vehicle control method that controls a vehicle that is autonomously driven and that is used for passenger transportation, the vehicle control method comprising:
> obtaining sensing information by sensing surroundings of the vehicle;
> detecting humans who are present around the vehicle from the sensing information;
> selecting a target person who is at least one of the detected humans;
> acquiring a first state indicating a state of the target person;
> acquiring a second state indicating a state of the vehicle;
> changing a speed setting of the vehicle in accordance with the first state and the second state; and
> controlling traveling of the vehicle at a speed indicated by the speed setting,
> wherein the method further includes:
>> storing a plurality of selection rules used for selecting target person, each of the plurality of selection rules including an attribute and an action of a human and a priority associated with each other;
>> creating verification data of each of the detected humans from the sensing information, the verification data indicating an attribute and an action of each of the detected humans;
>> comparing the verification data with the plurality of selection rules, and obtaining a priority for the verification data from the priority included in the selection rules;
>> selecting the target person by using the obtained priority; and
>> updating the plurality of selection rules by increasing the priority of a first selection rule of the plurality of selection rules, the first selection rule corresponding to the verification data of the selected target person and the target person has ridden in the vehicle.

9. A non-transitory recording medium storing thereon a computer program, which when executed by a processor, causes the processor to perform operations including:
> obtaining sensing information by sensing surroundings of a vehicle that is autonomously driven and that is used for passenger transportation;
> detecting humans who are present around the vehicle using the sensing information;
> selecting a target person who is at least one of the detected humans;
> acquiring a first state indicating a state of the target person;
> acquiring a second state indicating a state of the vehicle;
> changing a speed setting of the vehicle in accordance with the first state and the second state; and
> controlling traveling of the vehicle at a speed indicated by the speed setting,
> wherein the operations further includes:
>> storing a plurality of selection rules used for selecting target person, each of the plurality of selection rules including an attribute and an action of a human and a priority associated with each other;
>> creating verification data of each of the detected humans from the sensing information, the verification data indicating an attribute and an action of each of the detected humans;
>> comparing the verification data with the plurality of selection rules, and obtaining a priority for the verification data from the priority included in the selection rules;
>> selecting the target person by using the obtained priority; and
>> updating the plurality of selection rules by increasing the priority of a first selection rule of the plurality of selection rules, the first selection rule corresponding to the verification data of the selected target person and the target person has ridden in the vehicle.

10. The apparatus according to claim 1, wherein
in the updating, reducing the priority of a second selection rule of the plurality of selection rules, the second selection rule corresponding to the verification data of the selected target person and the target person has not ridden in the vehicle.

* * * * *